US011895717B2

(12) United States Patent
Qiao et al.

(10) Patent No.: US 11,895,717 B2
(45) Date of Patent: *Feb. 6, 2024

(54) CHARGING AGGREGATION CONTROL FOR NETWORK SLICES

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Vienna, VA (US); Jayshree Bharatia, Plano, TX (US); Jinsook Ryu, Oakton, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,329

(22) Filed: May 5, 2022

(65) Prior Publication Data

US 2022/0264669 A1 Aug. 18, 2022

Related U.S. Application Data

(63) Continuation of application No. 16/788,490, filed on Feb. 12, 2020, now Pat. No. 11,330,648.

(60) Provisional application No. 62/806,411, filed on Feb. 15, 2019.

(51) Int. Cl.
*H04W 16/02* (2009.01)
*H04W 76/12* (2018.01)

(52) U.S. Cl.
CPC .......... *H04W 76/12* (2018.02); *H04W 16/02* (2013.01)

(58) Field of Classification Search
CPC ....... H04W 76/12; H04W 16/02; H04W 4/24; H04M 15/66; H04M 15/44; H04M 15/00; H04L 12/1407; H04L 12/1403; H04L 12/14
See application file for complete search history.

(56) References Cited

U.S. PATENT DOCUMENTS

| 2018/0376444 | A1 | 12/2018 | Kim et al. |
| 2019/0223093 | A1 | 7/2019 | Watfa et al. |
| 2020/0015158 | A1* | 1/2020 | So ............................ H04W 8/20 |
| 2020/0196315 | A1 | 6/2020 | Young et al. |
| 2020/0252862 | A1* | 8/2020 | Kim ...................... H04W 60/00 |
| 2020/0296660 | A1* | 9/2020 | Wang .................. H04W 12/033 |
| 2021/0176613 | A1* | 6/2021 | Purkayastha ......... H04W 76/12 |

OTHER PUBLICATIONS

3GPP845 (Charging management; Study on Charging Aspects of Network Slicing, 3GPP TR 32.845v0.2.0), Jan. 2019.*

(Continued)

*Primary Examiner* — Lakeram Jangbahadur
(74) *Attorney, Agent, or Firm* — Robert Houston; Kavon Nasabzadeh; Philip R. Smith

(57) ABSTRACT

A session management function (SMF) receives, from a wireless device, a first message requesting establishment of a PDU session for a network slice associated with a service of a communication service provider (CSP). The first message comprises a single network slice selection assistance information (S-NSSAI) of the network slice and a CSP identifier (ID). The SMF sends, to the wireless device, a second message accepting the establishment of the PDU session for the network slice associated with the service of the CSP.

20 Claims, 24 Drawing Sheets

(56) References Cited

OTHER PUBLICATIONS

3GPP TS 23.502 V15.4.1 (Jan. 2019); Technical Specification; 3rd Generation Partnership Project; Technical Specification Group Services and System Aspects; Procedures for the 5G System; Stage 2; (Release 15).

3GPP TS 23.503 V15.4.0 (Dec. 2018); Technical Specification; 3rd Generation Partnership Project; Technical Specification Group Services and System Aspects; Policy and Charging Control Framework for the 5G System; Stage 2; (Release 15).

3GPP TS 32.240 V15.4.0 (Dec. 2018); Technical Specification; 3rd Generation Partnership Project; Technical Specification Group Services and System Aspects; Telecommunication management; Charging management; Charging architecture and principles; (Release 15).

3GPP TS 32.255 V15.0.0 (Sep. 2018); Technical Specification; 3rd Generation Partnership Project; Technical Specification Group Services and System Aspects; Telecommunication management; Charging management; 5G data connectivity domain charging; stage 2; (Release 15).

3GPP TS 32.290 V15.0.0 (Jun. 2018); Technical Specification; 3rd Generation Partnership Project; Technical Specification Group Services and System Aspects; Telecommunication management; Charging management; 5G system; Services, operations and procedures of charging using Service Based Interface (SBI); (Release 15).

S5-186290; (revision of S5-186111); 3GPP TSG SA WG5 (Telecom Management) Meeting #121; Kochi,India, Oct. 8-12, 2018; Source: Huawei Technology; Title: New SID on Charging Aspects of Network Slicing; Document for: Approval; Agenda Item: 7.2.

S5-192096; 3GPP TSG-SA5 Meeting #124; Taipei, Taiwan, Feb. 25-Mar. 1, 2019; Source: Huawei; Title: Addition of solution evaluation for solution #1.1; Document for: Approval; Agenda Item: 7.5.1.

S5-192097; 3GPP TSG-SA5 Meeting #124; Taipei, Taiwan, Feb. 25-Mar. 1, 2019; Source: Huawei; Title: Addition of solution for event based charging; Document for: Approval; Agenda Item: 7.5.1.

S5-192098; 3GPP TSG-SA5 Meeting #124; Taipei, Taiwan, Feb. 25-Mar. 1, 2019; Source: Huawei; Title: Addition of Use Case about Network Slice Subscription; Document for: Approval; Agenda Item: 7.5.1.

S5-192208; 3GPP TSG-SA5 Meeting #124; Taipei, Taiwan Feb. 25-Mar. 1, 2019; Source: Ericsson; Title: Solution to Performance based Charging; Document for: Approval; Agenda Item: 7.5.1.

3GPP TR 32.845 V0.2.0 (Dec. 2019); Technical Report; 3rd Generation Partnership Project; Technical Specification Group Services and System Aspects; Charging management; Study on Charging Aspects of Network Slicing; (Release (16).

* cited by examiner

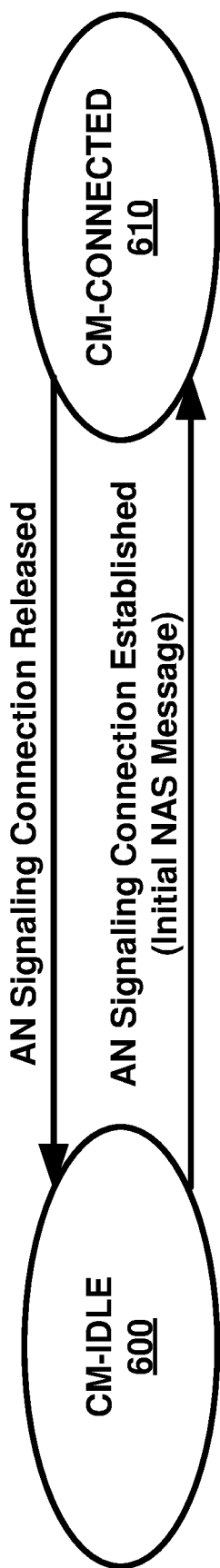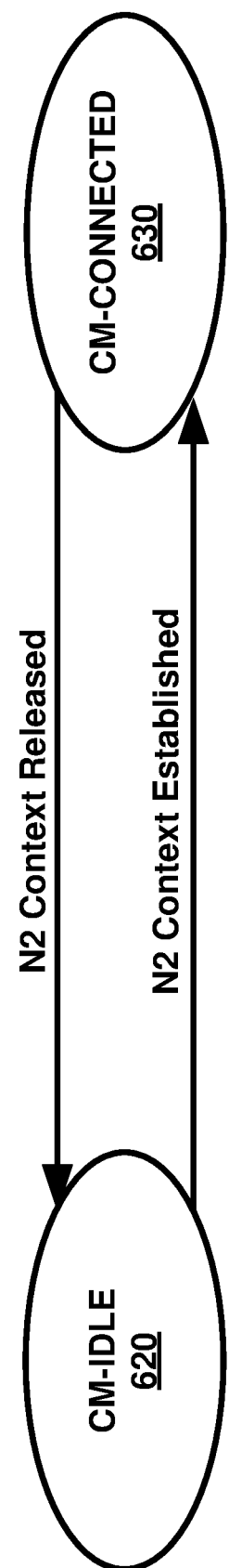

```
┌─────────────────────────────────────────────────────────────┐
│  receive, by a PCF from an SMF, a first message requesting  │
│  policy establishment for a PDU session of the wireless     │
│  device, the first message comprises a first S-NSSAI        │
│                          2410                                │
└─────────────────────────────────────────────────────────────┘
                              │
                              ▼
┌─────────────────────────────────────────────────────────────┐
│  receive, by the PCF from an AF, a second message          │
│  comprising: a CSP ID; a charging aggregation indication    │
│  for the CSP; or a list of S-NSSAIs for the CSP             │
│                          2420                                │
└─────────────────────────────────────────────────────────────┘
                              │
                              ▼
┌─────────────────────────────────────────────────────────────┐
│  map, by the PCF, the CSP ID to the PDU session based on    │
│  first S-NSSAI and the list of S-NSSAIs for the CSP         │
│                          2430                                │
└─────────────────────────────────────────────────────────────┘
                              │
                              ▼
┌─────────────────────────────────────────────────────────────┐
│  determine, by the PCF, charging aggregation control per    │
│  CSP for the PDU session based on: the map; the CSP ID; or  │
│  the charging aggregation indication                        │
│                          2440                                │
└─────────────────────────────────────────────────────────────┘
                              │
                              ▼
┌─────────────────────────────────────────────────────────────┐
│  send, by the PCF to the SMF, a third message for the PDU   │
│  session, the third message comprises an address of the CHF │
│  for the CSP; the CSP ID; or the charging aggregation       │
│  indication for the CSP                                     │
│                          2450                                │
└─────────────────────────────────────────────────────────────┘
```

FIG. 24

# CHARGING AGGREGATION CONTROL FOR NETWORK SLICES

CROSS-REFERENCE TO RELATED APPLICATIONS

This application is a continuation of U.S. patent application Ser. No. 16/788,490, filed Feb. 12, 2020, which claims the benefit of U.S. Provisional Application No. 62/806,411, filed Feb. 15, 2019, all of which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 6A and FIG. 6B depict two connection management state models in UE 100 and AMF 155 as per an aspect of embodiments of the present disclosure.

FIG. 24 is a flow diagram as per an aspect of an example embodiment of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to charging aggregation for network slices (e.g. for 5G or future communication system). Throughout the present disclosure, UE, wireless device, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 1:
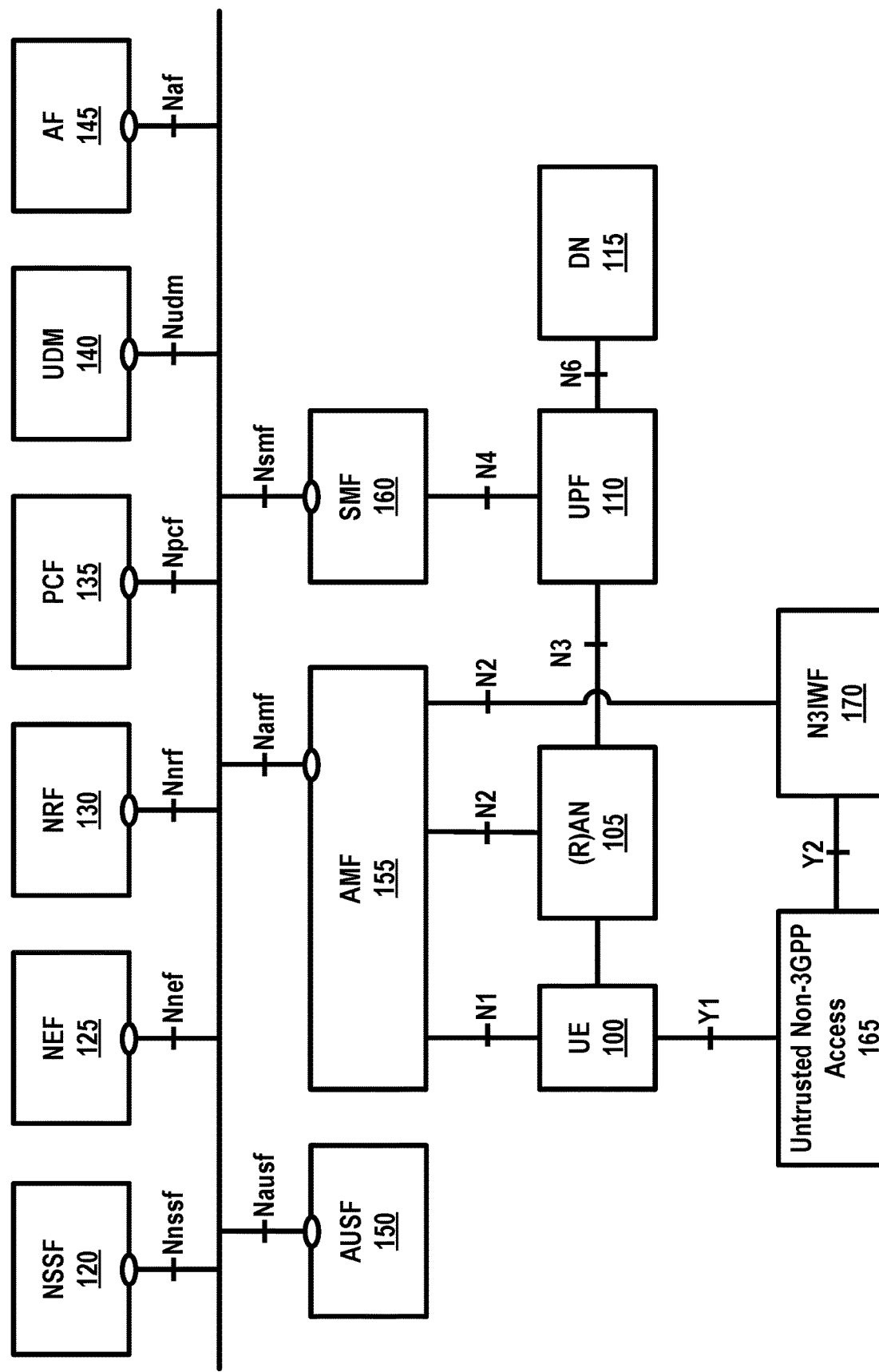
FIG. 1 is a diagram of an example 5G system architecture as per an aspect of an embodiment of the present disclosure.
Figure 2:
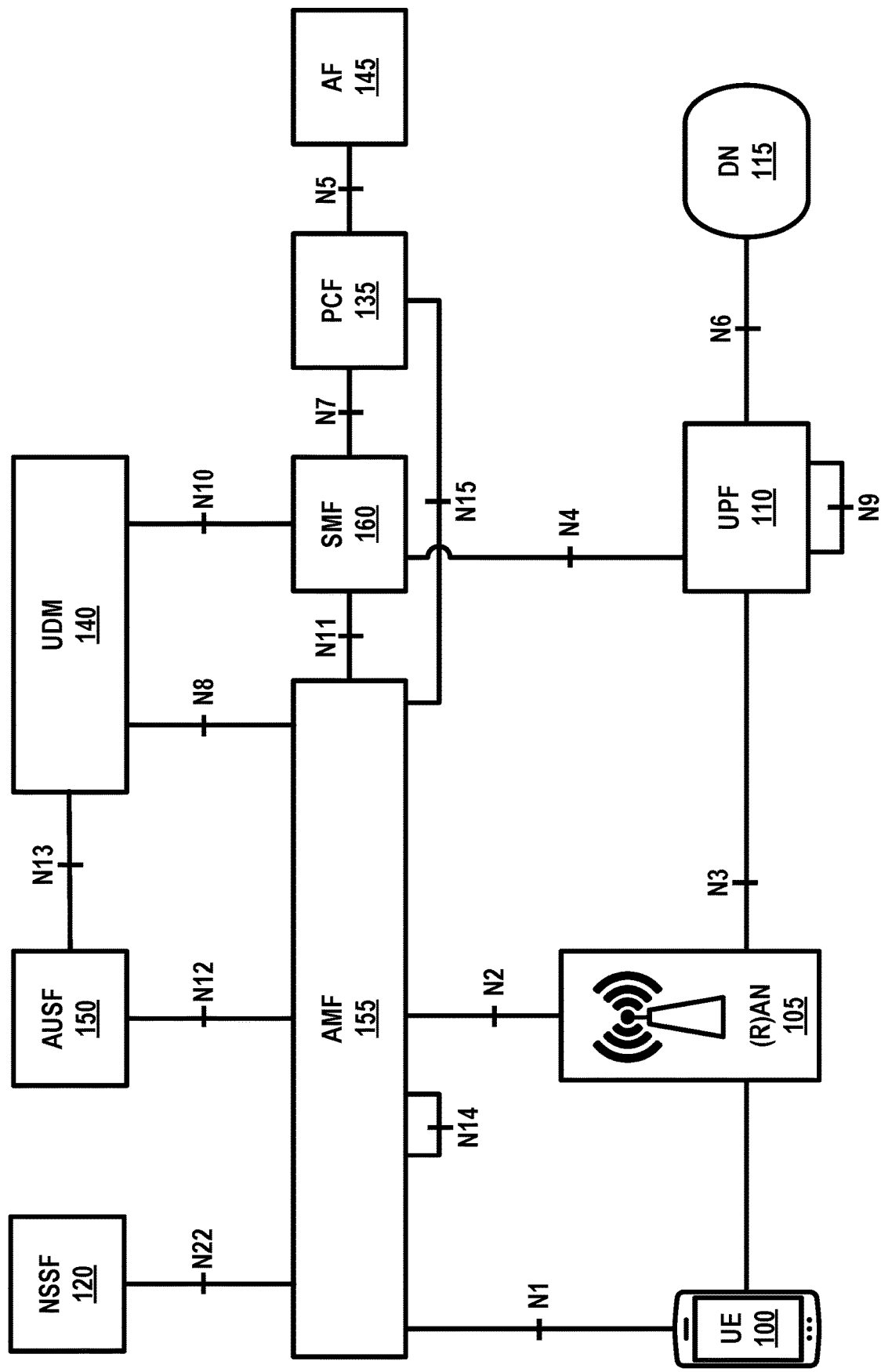
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMBR Aggregate Maximum Bit Rate
AMF Access and Mobility Management Function
AN Access Network
APN Access Point Name
ARP Allocation and Retention Priority
BD Billing Domain
CDR Charging Data Record
CHF Charging Function
CN Core Network
CP Control Plane
CSP Communication Service Provider
DDoS Distributed Denial of Service
DL Downlink
DN Data Network
DN-AAA Data Network Authentication Authorization and Accounting
DNN Data Network Name
EPS Evolved Packet System
FDD Frequency Division Duplex
FQDN Fully Qualified Domain Name
GPSI Generic Public Subscription Identifier
GW Gateway
HTTP Hypertext Transfer Protocol
ID Identifier
IMS IP Multimedia core network Subsystem
IOT Internet of Things
IP Internet Protocol
IP-CAN IP Connectivity Access Network
L2 Layer 2 (data link layer)
L3 Layer 3 (network layer)
LADN Local Area Data Network
LAN local area network
MAC Media Access Control
MICO Mobile Initiated Connection Only
N3IWF Non-3GPP InterWorking Function
NAS Non Access Stratum
NAT Network address translation
NEF Network Exposure Function
NF Network Function NR New Radio
NG-RAN NR Radio Access Network
NRF Network Repository Function
NSI Network Slice Instance
NSSAI Network Slice Selection Assistance Information
NSSF Network Slice Selection Function
NWDAF Network Data Analytics Function
OAM Operation Administration and Maintenance
PCC Policy and Charging Control
PCF Policy Control Function
PDU Packet Data Unit
PEI Permanent Equipment Identifier
PLMN Public Land Mobile Network
QCI QoS Class Identifier
QFI QoS Flow Identifier
QoS Quality of Service
RA Random Access
RAN Radio Access Network
RAT Radio Access Technology
RRC Radio Resource Control
RM Registration Management
SBA Service Based Architecture
SM Session Management
SMF Session Management Function
SMSF SMS Function
S-NSSAI Single Network Slice Selection Assistance information
SS Synchronization Signal
SSC Session and Service Continuity
SUPI Subscriber Permanent Identifier
TA Tracking Area
TAI Tracking Area Identity
TCP Transmission Control Protocol
UDR Unified Data Repository
UDM Unified Data Management
UDP User Datagram Protocol
UE User Equipment
UL Uplink
UL CL Uplink Classifier
UPF User Plane Function
URLLC Ultra-Reliable Low Latency Communication
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
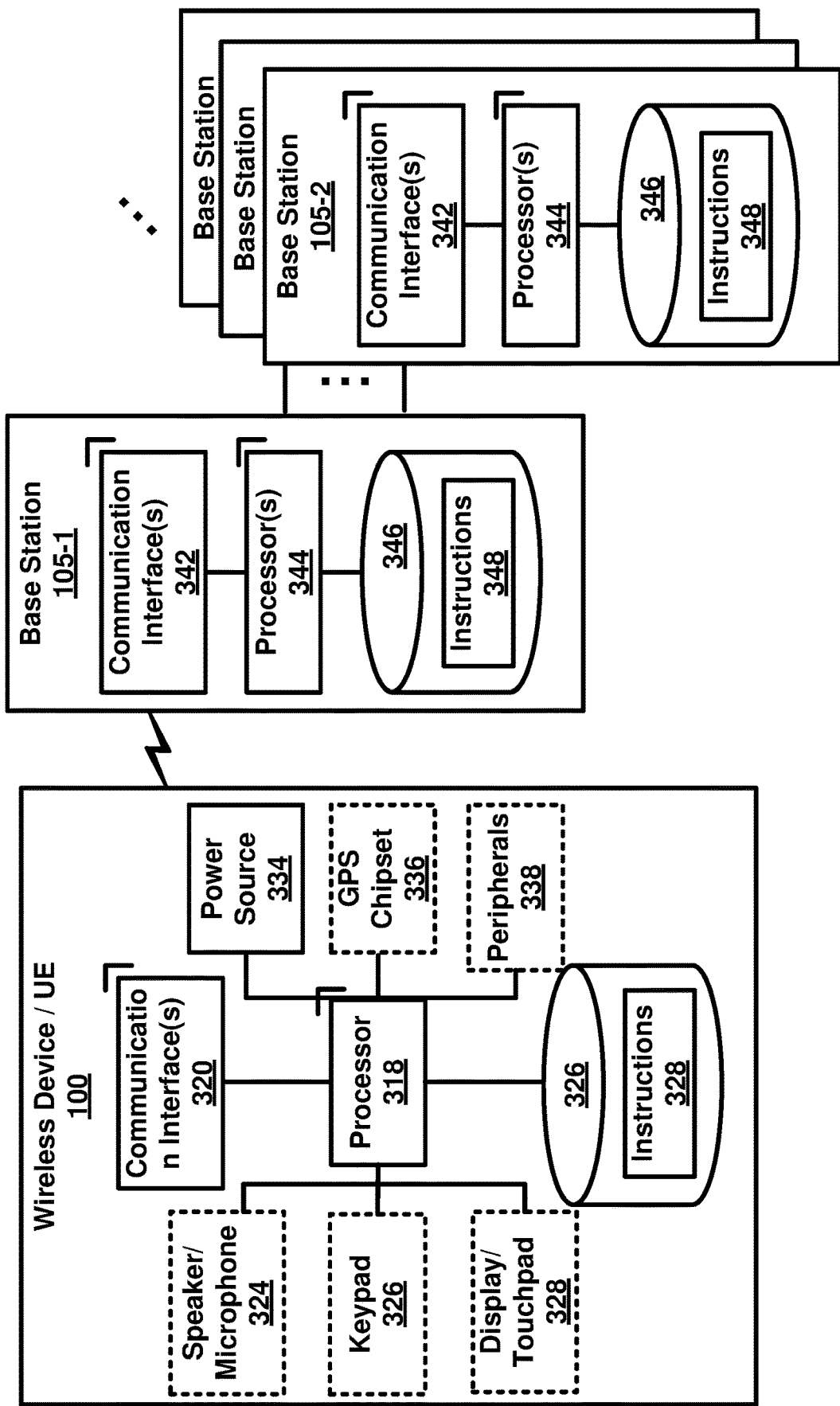
FIG. 3 is a system diagram of an example wireless device and a network node in a 5G system as per an aspect of an embodiment of the present disclosure.
Figure 4:
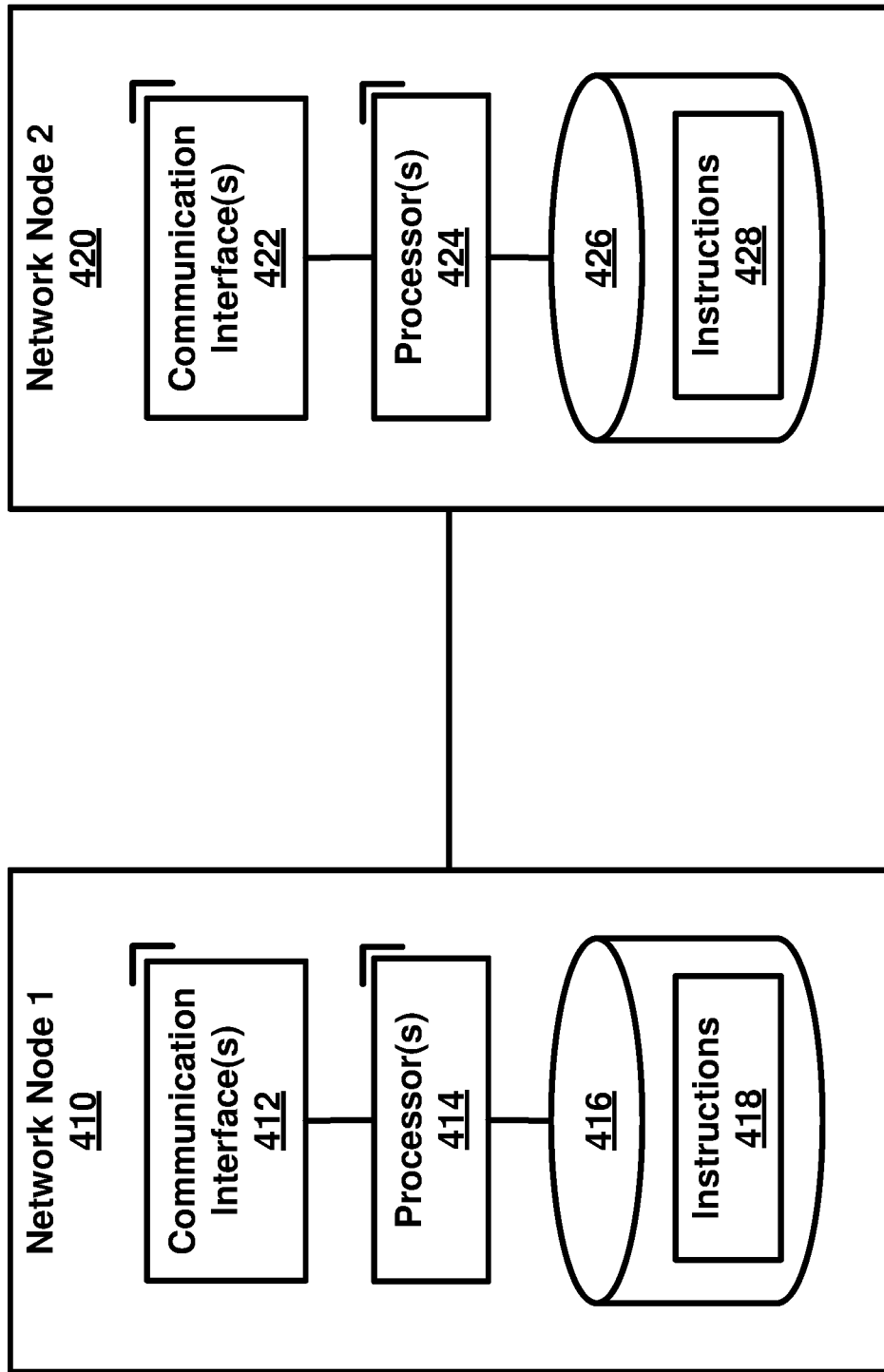
FIG. 4 is a system diagram of an example network nodes as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of an SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
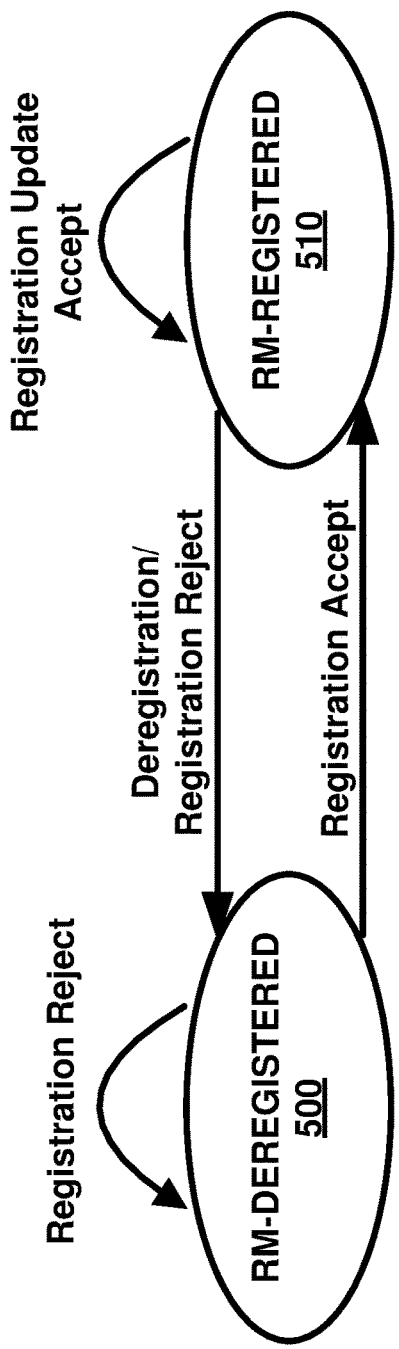
FIG. 5A and FIG. 5B depict two registration management state models in UE 100 and AMF 155 as per an aspect of embodiments of the present disclosure.
Figure 5B:
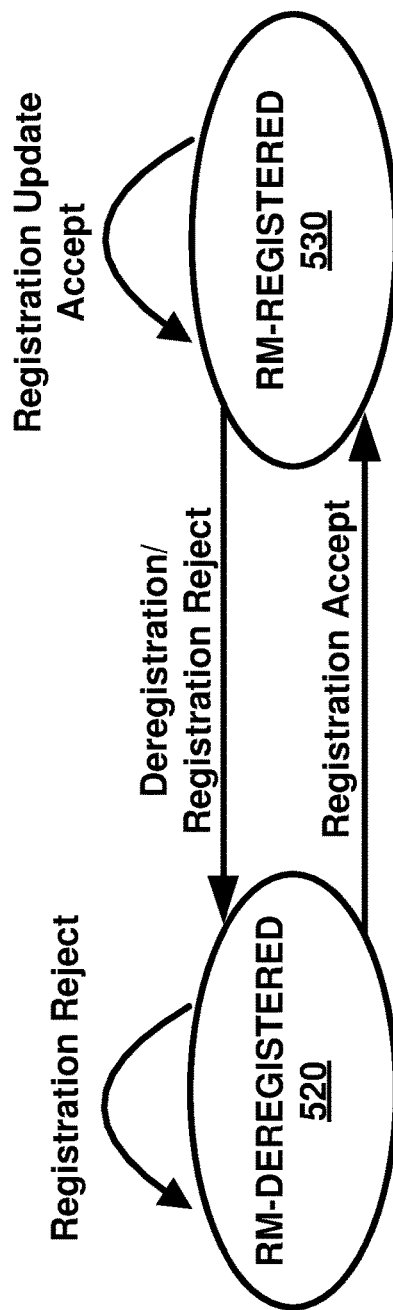

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
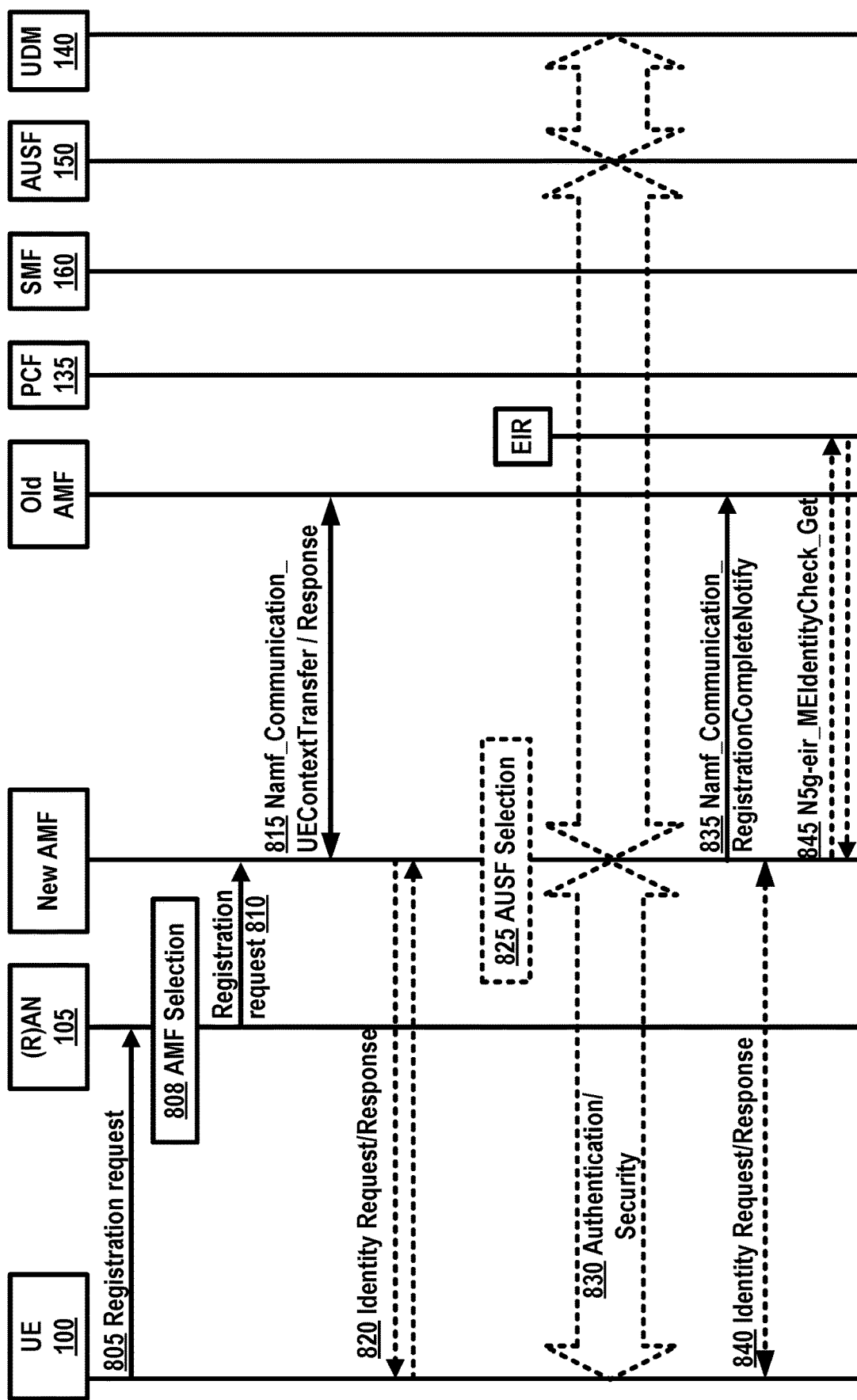
FIG. 8 is an example call flow for registration procedure as per an aspect of an embodiment of the present disclosure.
Figure 9:
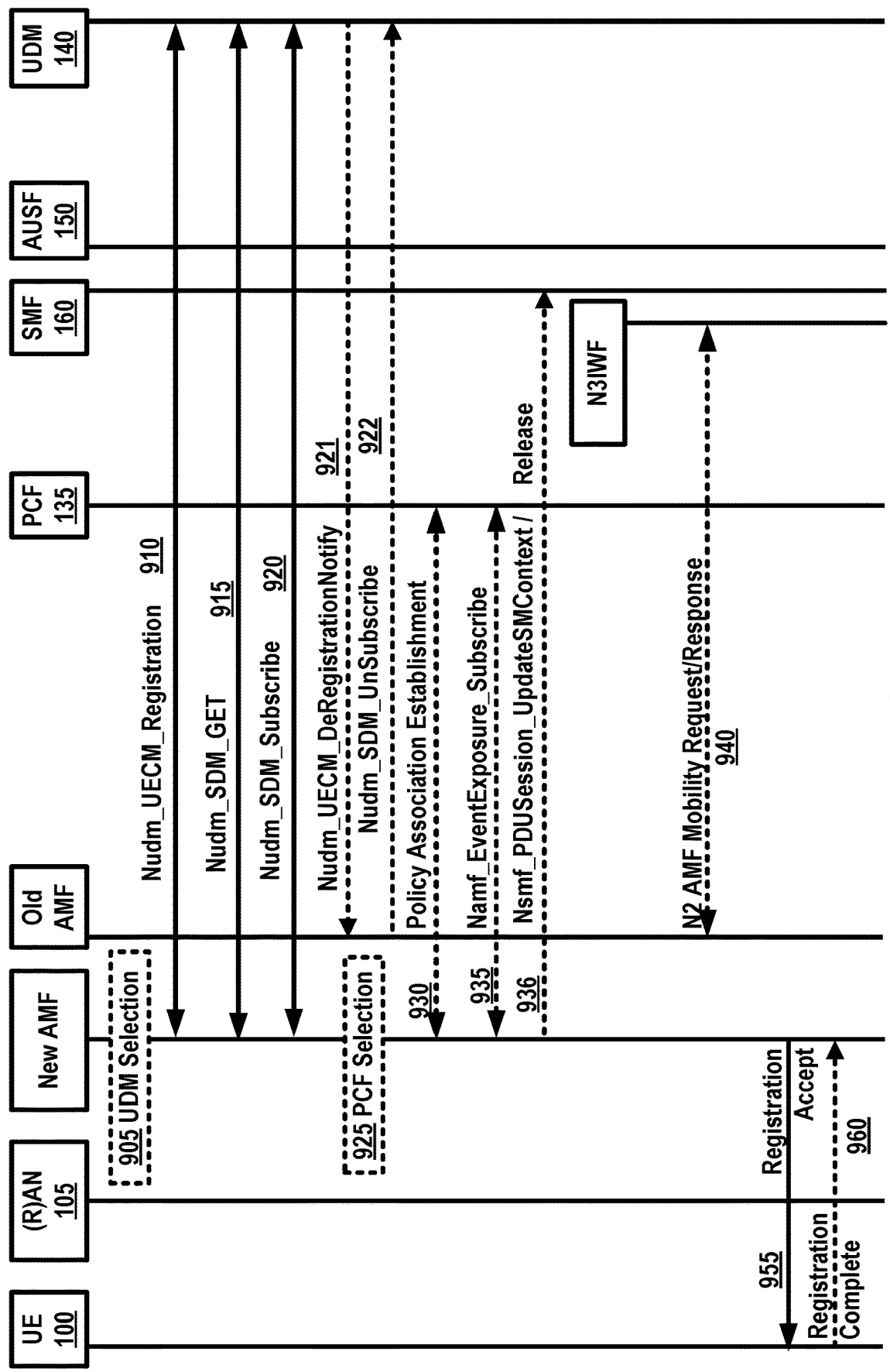
FIG. 9 is an example call flow for registration procedure as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
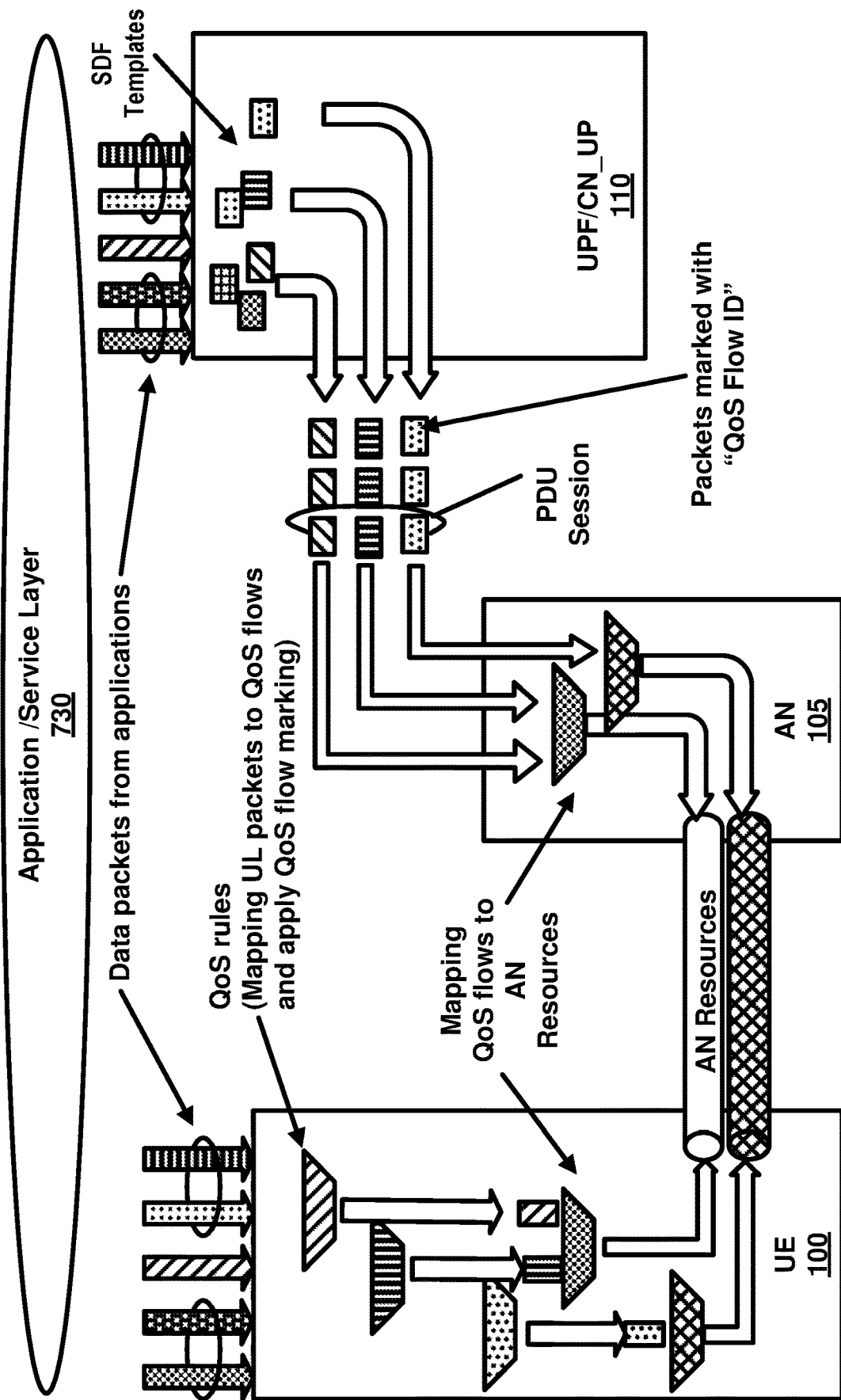
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message.

For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
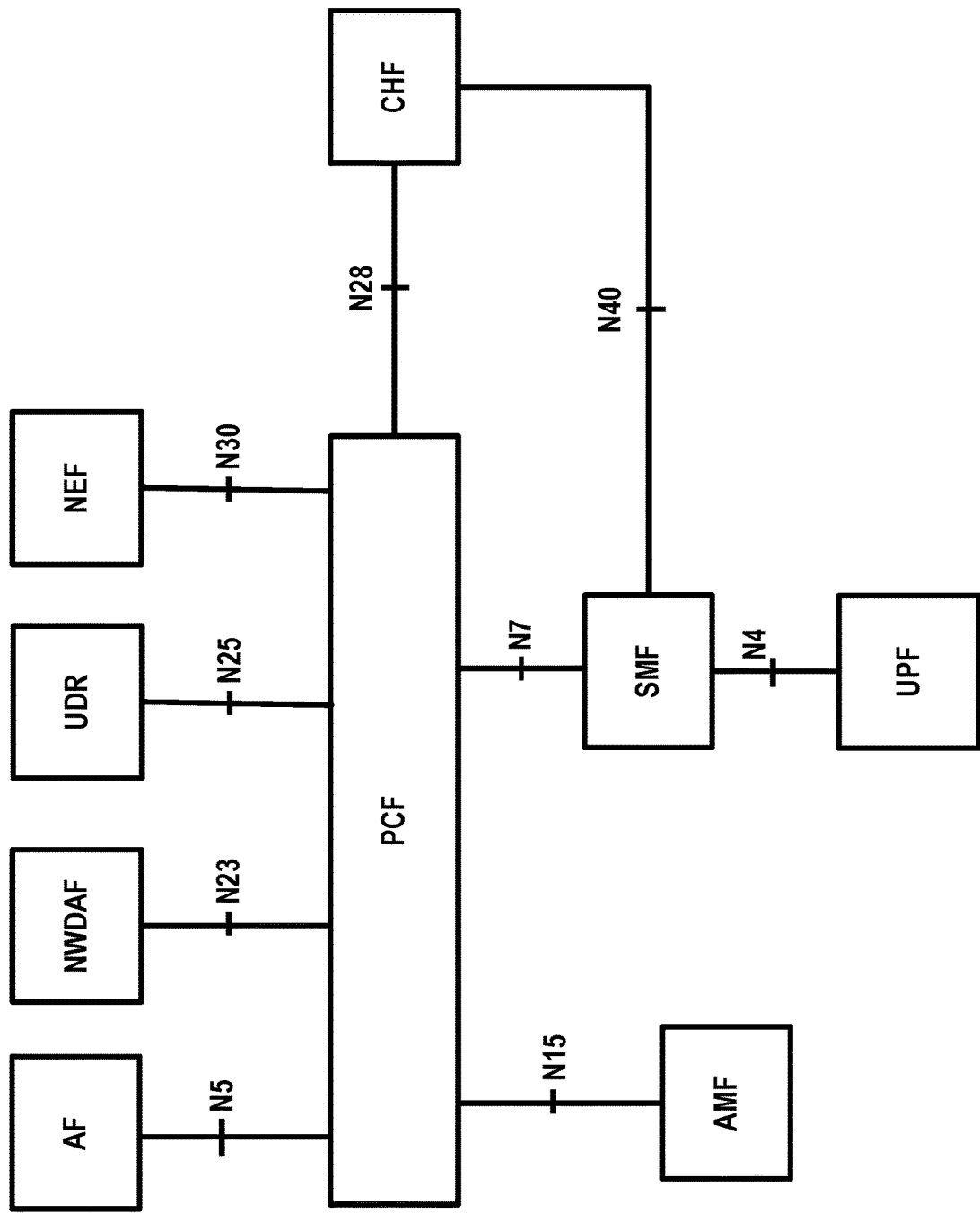
FIG. 10 is a diagram of an example 5G policy and charging control system architecture as per an aspect of an embodiment of the present disclosure.

In an example, FIG. 10 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging.

In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered.

In an example, online charging may be a process where charging information for network resource usage may be collected concurrently with that resource usage in the same fashion as in offline charging. Authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required.

In an example, converged charging may be a process where online and offline charging may be combined.

Figure 11:
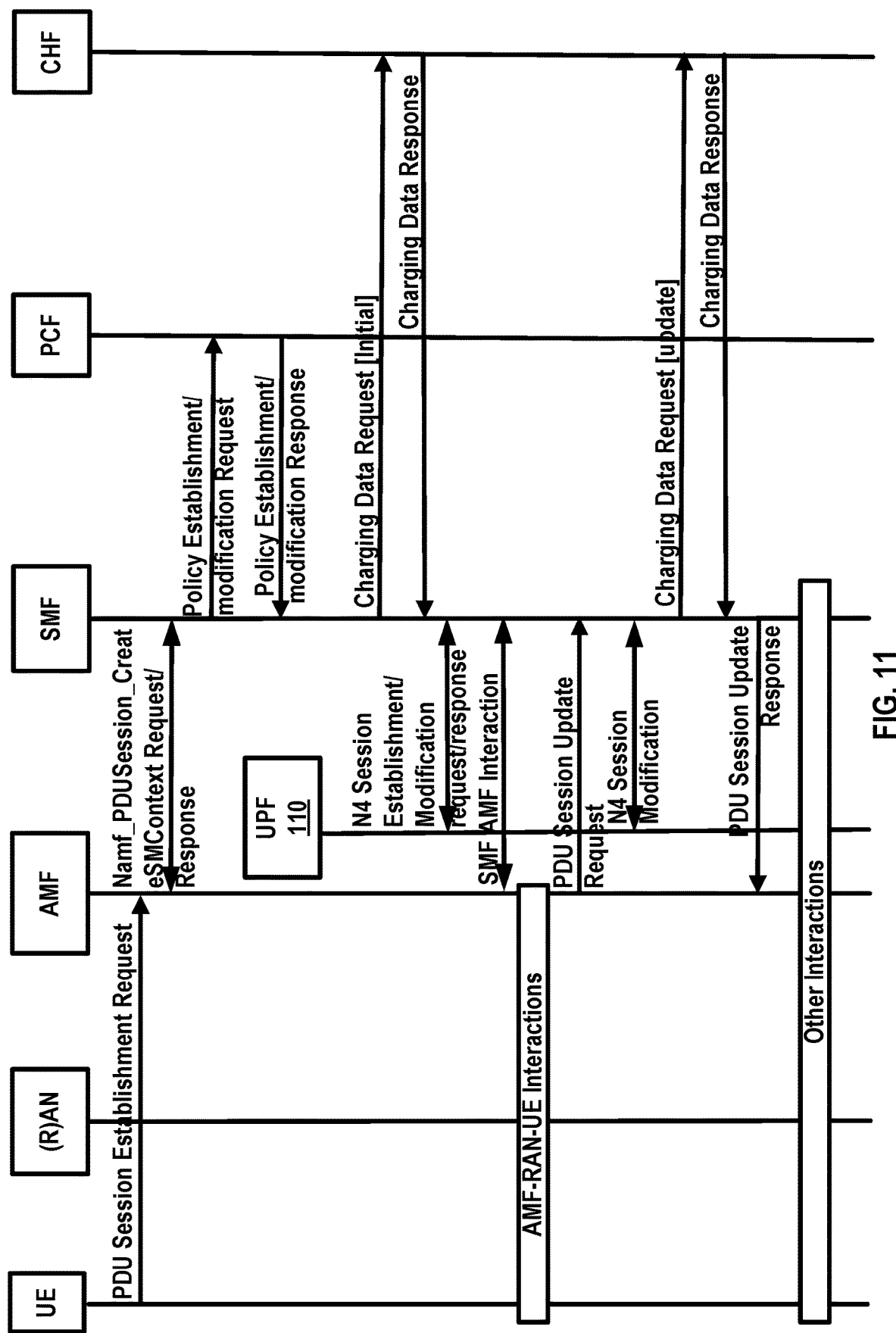
FIG. 11 is an example call flow for PDU session establishment charging as per an aspect of an embodiment of the present disclosure.

FIG. 11 is an example call flow for PDU session establishment charging as per an aspect of an embodiment of the present disclosure.

In an example, a UE may initiate a PDU Session establishment procedure by sending a PDU Session Establishment Request message to an AMF. The PDU Session Establishment Request message may comprise one or more of: PDU session ID, PDU Type, SSC mode, User location information, and Access Technology Type Information.

In response to the message received from the UE, an AMF may select an SMF and send to the selected SMF a message (e.g. Namf_PDUSession_CreateSMContext Request). The message sent to the SMF may be used by the AMF to request establishing the PDU session. In response to receiving the message from the AMF, the SMF may send a response message (e.g. Namf_PDUSession_CreateSMContext Response) to the AMF to indicate whether the request from the AMF is accepted or not.

In an example, the SMF may select a PCF and send to the PCF a message (e.g. SM Policy Association Establishment Request) to request PCC rules. The PCF may provide PCC rules in a response message (e.g. SM Policy Association Establishment response) to the SMF.

In an example, the SMF may create a Charging Id for the PDU session and may send a Charging Data Request [initial] message to a CHF to verify authorization of a subscriber of the UE to start the PDU session which is triggered by start of PDU session charging event.

In an example, the CHF may open a charging data record (CDR) for the PDU session and may acknowledge the Charging Data Request message by sending Charging Data Response to the SMF.

In an example, the SMF selects a UPF and may initiate an N4 Session Establishment/Modification procedure with the selected UPF.

The SMF may interact with the AMF. For example, the SMF may send to the AMF a Namf_Communication_N1N2MessageTransfer message comprising one or more of: PDU session ID, QoS Profile(s), CN Tunnel Info, and S-NSSAI from the Allowed NSSAI. This SMF/AMF interaction is labeled in FIG. 11 as SMF AMF Interaction.

In an example, the AMF may interact with the (R)AN and the UE. This interaction is labeled in FIG. 11 as AMF-RAN-UE Interactions. As part of the AMF-RAN-UE Interactions, the AMF may interact with the (R)AN and the UE by sending to the (R)AN a N2 PDU Session Request message comprising the information received from the SMF that indicates the PDU session establishment is accepted.

In an example, and as further part of the AMF-RAN-UE Interactions, the (R)AN may send to the AMF a N2 PDU Session Response message comprising one or more of: PDU session ID, N2 SM information (PDU session ID, AN Tunnel Info, List of accepted/rejected QFI(s)), wherein the AN Tunnel Info may correspond to the Access Network address of the N3 tunnel corresponding to the PDU Session.

In an example, the AMF may send to the SMF a PDU Session Update Request message (e.g. Nsmf_PDUSession_UpdateSMContext Request message) comprising the N2 SM information received from the (R)AN to the SMF.

In an example, the SMF may initiate an N4 Session Modification procedure with the UPF. As part of the N4 Session Modification procedure, the SMF may provide AN Tunnel Info to the UPF as well as the corresponding forwarding rules, and the UPF may send to the SMF a response message.

In an example, the SMF may request quota from CHF, e.g. "start of service data flow" event may need quota from CHF. The SMF may send a message to the CHF (e.g. Charging Data Request [update]). In an example, for online charging or converged charging, the SMF may request quota from CHF when allocated quota is consumed or a trigger is met to request a quota.

In an example, the UPF may report resource usage of a PDU session to the SMF. In an example, the UPF may report resource usage of a wireless device to the SMF. by enforcing the charging control rules, the SMF may send to the CHF a message (e.g. Charging Data Request [update]) comprising resource usage information received from the UPF.

In an example, the CHF may update CDR for this PDU session. The CHF may acknowledge the SMF by sending a Charging Data Response message.

In an example, the SMF may send to the AMF a Nsmf_PDUSession_UpdateSMContext Response message.

In an example, other interactions may be performed between SMF, AMF, (R)AN and UE for the PDU session establishment procedure, this interaction is labeled in FIG. 11 as Other Interactions.

In an example, 5GC may be able to provide policy information from a PCF to a UE, and such policy information may include Access Network Discovery & Selection Policy (ANDSP) and/or UE Route Selection Policy (URSP).

In an example, the ANDSP is used by the UE for selecting non-3GPP accesses and for selection of the N3IWF in a PLMN. In an example, the URSP is used by the UE to determine if a detected application may be associated to an established PDU Session, may be offloaded to non-3GPP access outside a PDU Session, or may trigger the establishment of a new PDU Session. In an example, the URSP rules may include traffic descriptors that specify the matching criteria and one or more of the following components: SSC Mode Selection Policy (SSCMSP), Network Slice Selection Policy (NSSP), DNN Selection Policy, PDU Session Type Policy, Non-seamless Offload Policy, and/or Access Type preference. In an example, the SSCMSP is used by the UE to associate the matching application with SSC modes. In an example, the NSSP is used by the UE to associate the matching application with S-NSSAI. In an example, the DNN Selection Policy is used by the UE to associate the matching application with DNN. In an example, the PDU Session Type Policy is used by the UE to associate the matching application with a PDU Session Type. In an example, the Non-seamless Offload Policy is used by the UE to determine that the matching application should be non-seamlessly offloaded to non-3GPP access (i.e. outside of a PDU Session). In an example, the Access Type preference may indicate the preferred Access Type (3GPP or non-3GPP) If the UE needs to establish a PDU Session for the matching application, this. In an example, the ANDSP and URSP may be pre-configured in the UE or may be provisioned to UE from PCF. The pre-configured policy may be applied by the UE when it has not received the same type of policy from PCF. In an example, the PCF may select the ANDSP and URSP applicable for a UE based on local configuration, Subscribed S-NSSAIs and operator policies taking into consideration e.g. accumulated usage, load level information per network slice instance, UE location. In an example, in the case of a roaming UE, the V-PCF may retrieve ANDSP and URSP from the H-PCF over N24/Npcf. When the UE is roaming and the UE has valid rules from both HPLMN and VPLMN the UE may give priority to the valid ANDSP rules from the VPLMN.

In an example, the ANDSP and URSP may be provided from the PCF to an AMF via N15/Namf interface and then from AMF to the UE via the N1 interface. The AMF may not change the ANDSP and the URSP provided by PCF.

In an example, the PCF may be responsible for delivery of UE policy. If the PCF is notified UE Policy delivery failure (e.g. because of UE unreachable), the PCF may subscribe the "Connectivity state changes (IDLE or CONNECTED)" event. After reception of the Notify message indicating that the UE enters the CM-Connected state, the PCF may retry to deliver the UE Policy.

In an example, an operator may provide a network slice service to satisfy requirements of a Communication Service Provider (CSP).

A CSP may need multiple performance-guaranteed network slices to deliver its service and subscribes multiple private/shared network slice instances from the operator based on network slice's performance requirements (e.g. latency) and/or usage (e.g. volume, duration, number of connections).

Based on the subscription, during the operation phase, the operator may create/activate multiple new network slice instances (NSIs) or allocate existing NSIs. For one or more of the NSIs, the operator may collect charging information and enable charging information collection based on subscription and actual usage. If the measurement method for the charging information is usage, the operator may collect the NSI's usage for CSP. If the measurement method for the chagrining information is performance data, the operator may collect performance data.

Based on the subscription and collection, the operator may record and/or report the NSI charging information and then aggregate the charging information for CSP.

The Network Operator (NOP) may be the network slice provider, and the CSP may be the network slice customer.

In an example, a 5G system may support collecting charging information of performance metrics of private slice instances.

In an example, a 5G system may support collecting charging information of CSP's usage of private slice instances.

In an example, a 5G system may support collecting charging information of performance metrics of shared slice instances.

In an example, a 5G system may support collecting charging information of CSP's usage of shared slice instances.

In an example, a 5G system may support aggregation of charging information of multiple CSP's slice instances.

Existing technologies may have issues supporting aggregation of charging information of multiple network slice instances of a CSP. If the PCC is not deployed, existing technologies may have issues that an SMF cannot get a CSP ID to support aggregation of charging information of multiple network slice instances of a CSP. Existing technologies and, in particular, an SMF in existing technologies may have issues determining charging aggregation control for a CSP. Existing technologies may have issues determining how to implement charging information aggregation for multiple network slice instances of a CSP in a CHF. Existing technologies may have issues determining how to implement quota control per CSP. If PCC is deployed, existing technologies and, in particular, a PCF may have issues determining charging aggregation control for a CSP.

Embodiments of the present disclosure provide enhanced mechanisms to implement aggregation of charging information of multiple CSP slice instances. If the PCC is not deployed, embodiments of the present disclosure provide enhanced mechanisms to provide CSP ID to an SMF to support aggregating charging information of network slice instances for a CSP. Embodiments of the present disclosure provide enhanced mechanisms such that an SMF may determine charging aggregation control for a CSP. Embodiments of the present disclosure provide enhanced mechanisms such that an SMF may determine a CHF for multiple network slice instances for the charging aggregation control of a CSP. Embodiments of the present disclosure provide enhanced mechanisms such that a CHF may determine quota information per CSP and send the quota information to an SMF for enforcement. If PCC is deployed, embodiments of the present disclosure provide enhanced mechanisms such that a PCF may determine charging aggregation control for a CSP. Embodiments of the present disclosure provide enhanced mechanisms that a PCF may determine a CHF for multiple network slice instances for the charging aggregation control of a CSP. These enhanced mechanisms may provide efficient solutions to support aggregation of charging information of multiple network slice instances of a CSP.

In an example, a UE may receive a CSP ID from a CSP, and the UE may send the CSP ID to an SMF via an AMF. The SMF may determine charging aggregation control per CSP based on the CSP ID and/or charging aggregation information received from a UDM and/or NSSF. The SMF may select a CHF for multiple network slices per CSP for charging aggregation. The CHF may allocate quota per CSP and send to the SMF for enforcement.

Figure 12:
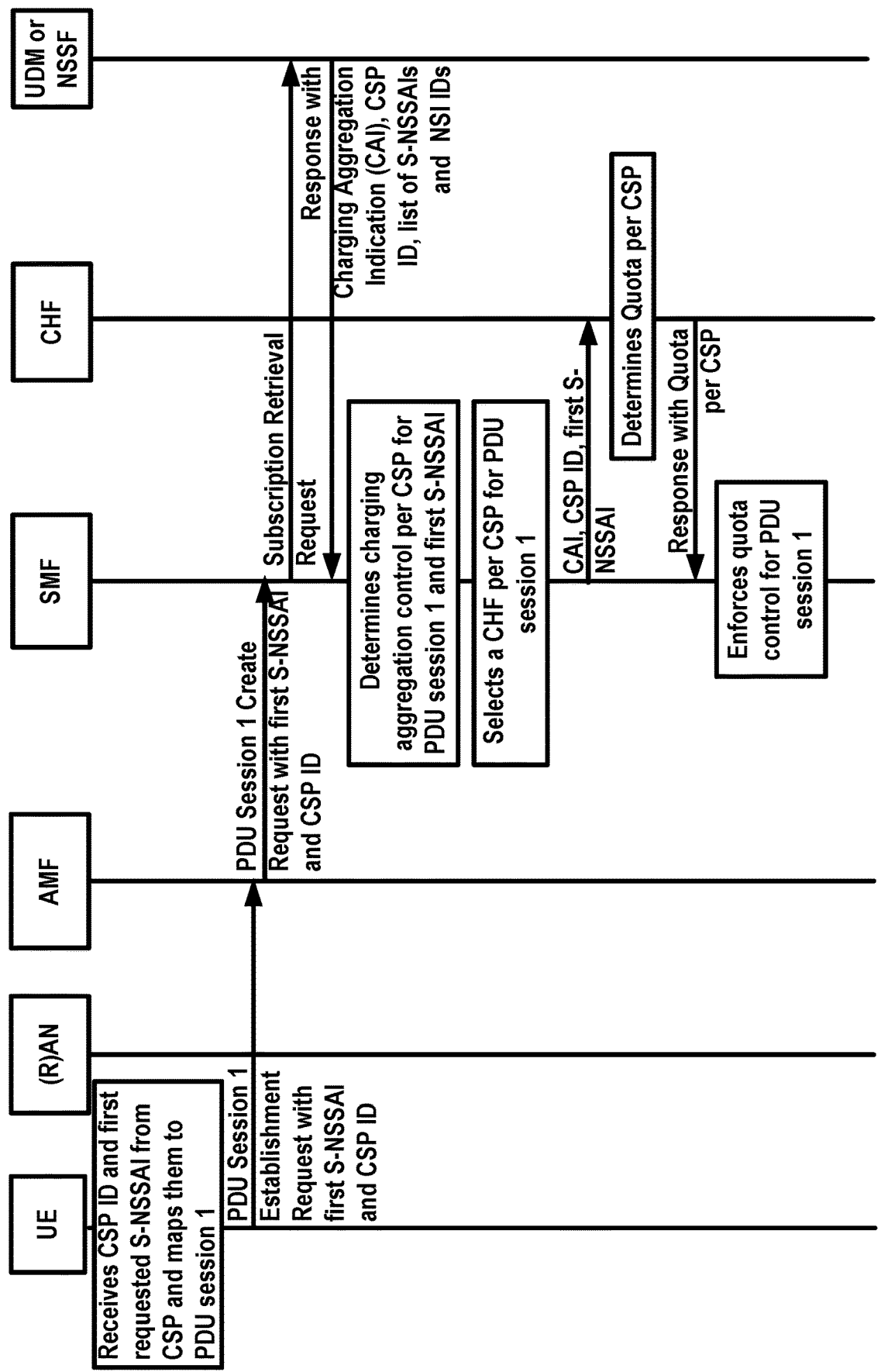
FIG. 12 is an example call flow as per an aspect of an embodiment of the present disclosure.

FIG. 12 shows example call flows which may comprise one or more actions. A UE may receive an identifier of a CSP (e.g. CSP ID) and/or requested network slice information from a CSP and/or an AF. In an example, the UE may receive from the CSP and/or the AF a parameter requesting establishment a PDU session for the requested network slice information and/or the CSP ID. The CSP ID may be used to identify a CSP. The requested network slice information may be used by the CSP and/or the AF to indicate a network slice to be applied to the CSP ID for a service/application provided by the CSP and/or the AF. The requested network slice information may comprise requested S-NSSAI(s), allowed S-NSSAI(s), and/or subscribed S-NSSAI(s). In an example, the requested network slice information may comprise a first requested S-NSSAI for the CSP. In an example, the UE may receive the CSP ID and/or the requested network slice information from the CSP and/or the AF via an application signaling on a PDU session. In an example, the UE may receive the CSP ID and/or the requested network slice information from the CSP and/or the AF via a network function (e.g. an OAM). The UE may determine to initiate a first PDU session and map the CSP ID and/or the first requested S-NSSAI to a first PDU session, where the first PDU session may be identified by a first PDU session ID. In an example, the UE may map the CSP ID and/or the requested network slice information (e.g. the first requested S-NSSAI) to a first network slice instance where the first network slice instance is identified by first S-NSSAI(s) and/or first network slice instance identifier(s) (NSI ID(s)) of the first S-NSSAI(s). In an example, the first S-NSSAI(s) may be from an allowed NSSAI. In an example, the UE may match the requested network slice information to the first network slice instance if the requested network slice information (e.g. the first requested S-NSSAI) is the same as the first network slice instance (e.g. the first S-NSSAI), or the first network slice instance can meet the service requirement of the requested network slice information.

The UE may send to an AMF a first NAS message comprising at least one of: the first S-NSSAI(s) and/or the first NSI ID(s) of the first S-NSSAI(s), a first DNN, the first PDU session ID, Request type, or N1 SM container (PDU session establishment request). The UE may initiate a UE requested PDU session establishment procedure by transmitting a first PDU session establishment request message within the N1 SM container of the NAS message. The first PDU session establishment request message may comprise at least one of: the first PDU session ID, Requested PDU Session Type, or a Requested SSC mode, etc. In an example, the NAS message may comprise the CSP ID for the first PDU session. In an example, the UE may transmit the NAS message via a RAN node (e.g. gNB, eNB, base station). The UE may transmit, to the RAN node, a radio resource control (RRC) message (e.g. uplink (UL) information transfer message, RRC setup complete message, RRC resume complete message, RRC reconfiguration complete message, and/or the like) comprising the first NAS message. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the first NAS message.

In response to the NAS message received from the UE, the AMF may select an SMF and send to the selected SMF a first message (e.g. PDUSession_CreateSMContext Request) comprising at least one of: SUPI, the first DNN, the first S-NSSAI(s) and/or the first NSI ID(s) of the first S-NSSAI(s), the first PDU session ID, AMF ID, Request Type, Priority Access, N1 SM container (PDU Session Establishment Request), User location information, Access Type, PEI). The message sent to the SMF may be used by the AMF to request establishing the PDU session. In response to the PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)). The SMF may send to a UDM and/or NSSF a message (e.g. subscription retrieval request, or Nnssf_NSSelection_Get) requesting user subscription information. The subscription retrieval request/Nnssf_NSSelection_Get message sent to the UDM and/or the NSSF may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; the first DNN, the first S-NSSAI(s) and/or the first NSI ID(s) of the first S-NSSAI(s), the first PDU session ID, user location information, or information of the SMF for the PDU session (e.g. SMF identifier, IP address or FQDN of the SMF). In an example, the subscription retrieval request/Nnssf_NSSelection_Get message sent to the UDM and/or the NSSF may comprise the CSP ID of the first PDU session.

In response to the subscription retrieval request/Nnssf_NSSelection_Get message received from the SMF, the UDM and/or the NSSF may take one or more actions. In an example action, the UDM and/or the NSSF may determine that a charging aggregation control per CSP is applied to network slice(s) and/or a PDU session, wherein the CSP may be identified by the CSP ID, the network slice(s) may be identified by the first S-NSSAI(s) and/or the first NSI ID(s) of the first S-NSSAI(s), and the PDU session may be identified by the first PDU session ID. In an example, the UDM and/or the NSSF may determine the charging aggregation control per CSP based on the operator policy, the local policy and/or the configuration. In an example, the user subscription information may comprise an indication that the charging aggregation control is applied to the CSP ID, and the UDM and/or the NSSF may determine the charging aggregation control per CSP based on the user subscription information. In an example, the UDM and/or the NSSF may determine a charging aggregation indication to indicate the charging aggregation control per CSP. In an example, the UDM and/or the NSSF may determine a list of network slices and/or network slice instances applied to the charging aggregation control per CSP. In an example, the list of network slices and/or network slice instances may comprise at least one S-NSSAI and/or at least one NSI ID of the at least one S-NSSAI. In an example, the at least one S-NSSAI may a subscribed S-NSSAI. In an example, the at least one S-NSSAI may be one of allowed NSSAI. In an example, the at least one S-NSSAI and/or at least one NSI ID of the at least one S-NSSAI may comprise: a first S-NSSAI with an SST value of eMBB and an NSI ID 1 of the first S-NSSAI, and/or a second S-NSSAI with an SST value of URLLC and an NSI ID 2 of the second S-NSSAI, and/or a third S-NSSAI with an SST value of MIoT and an NSI ID 1 of the third S-NSSAI.

In an example action, the UDM and/or NSSF may send to the SMF a response message (e.g. subscription retrieval response, or Nnssf_NSSelection_Get response) comprising at least one of: the CSP ID for the first PDU session; the charging aggregation indication applied to the CSP; and/or the list of network slices and/or network slice instances applied to the CSP.

In response to the subscription retrieval response message received from the UDM, the SMF may take one or more actions. In an example, based on the subscription information received from the UDM and/or NSSF, and/or local operator policy and/or the information received from the AMF, the SMF may determine charging aggregation control per CSP applied to the UE and/or network slice(s) and/or the PDU session. In an example, the SMF may determine charging aggregation control per CSP applied to the first S-NSSAI and/or the first NSI ID of the first S-NSSAI and/or the first PDU session, and the determining may be based on the CSP ID and/or the first S-NSSAI and/or the first NSI ID of the first S-NSSAI received from the AMF and/or the information received from the UDM and/or NSSF (e.g. the CSP ID for the first PDU session; the charging aggregation indication applied to the CSP; and/or the list of network slices and/or network slice instances applied to the CSP). In an example, the SMF may determine charging aggregation control per CSP for a PDU session and/or an network slice based on information matching, e.g. the CSP ID received from the AMF is matched/the same as the CSP ID received from the UDM and/or NSSF, and/or the first S-NSSAI received from the AMF is matched/the same as one of the list of network slices received from the UDM and/or NSSF, and/or the first NSI ID received from the AMF is matched/the same as one of the NSI ID received from the UDM and/or NSSF.

In an example action, based on the charging aggregation control per CSP determined by the SMF, the SMF may determine/select a CHF per CSP for the first PDU session and/or the first S-NSSAI and/or the first NSI ID of the first S-NSSAI. The SMF may send to the CHF a message (e.g. a first charging data request) comprising at least one of: the CSP ID for the first PDU session; the first PDU session ID; the charging aggregation indication applied to the CSP; or the first S-NSSAI and/or the first NSI ID of the first S-NSSAI applied to the CSP.

In response to the first charging data request message, the CHF may determine a first quota per CSP for charging aggregation based on the information received from the SMF (e.g. the CSP ID; the charging aggregation indication applied to the CSP; or the first S-NSSAI and/or the first NSI ID of the first S-NSSAI applied to the CSP). In an example, the first quota per CSP may comprise at least one of: a granted unit; a time quota threshold; or a volume quota threshold. The CHF may send to the CHF a first response message (e.g. first charging data response) comprising the first quota per CSP.

Figure 13:
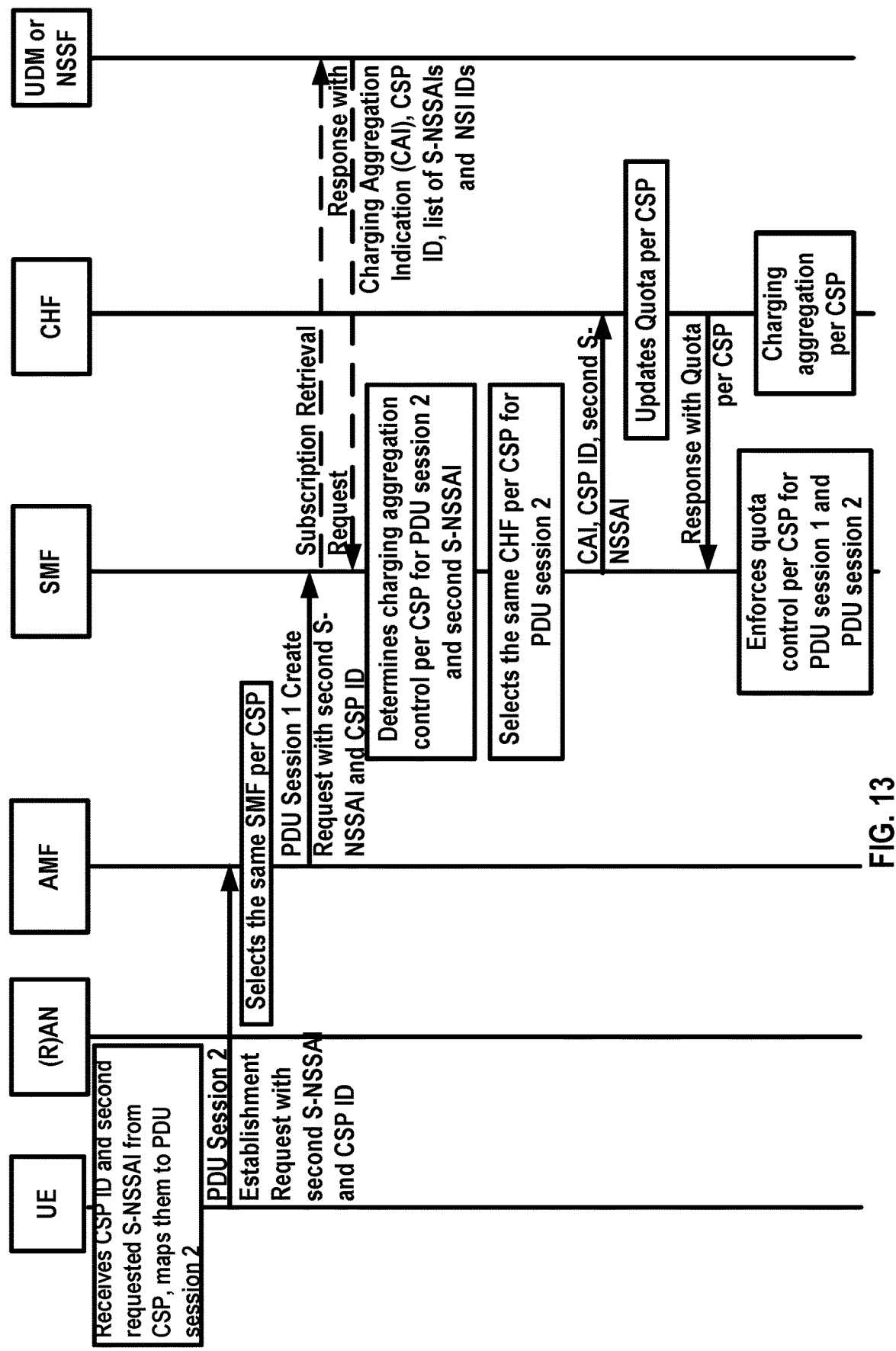
FIG. 13 is an example diagram depicting the procedures of UE as per an aspect of an embodiment of the present disclosure.
Figure 14:
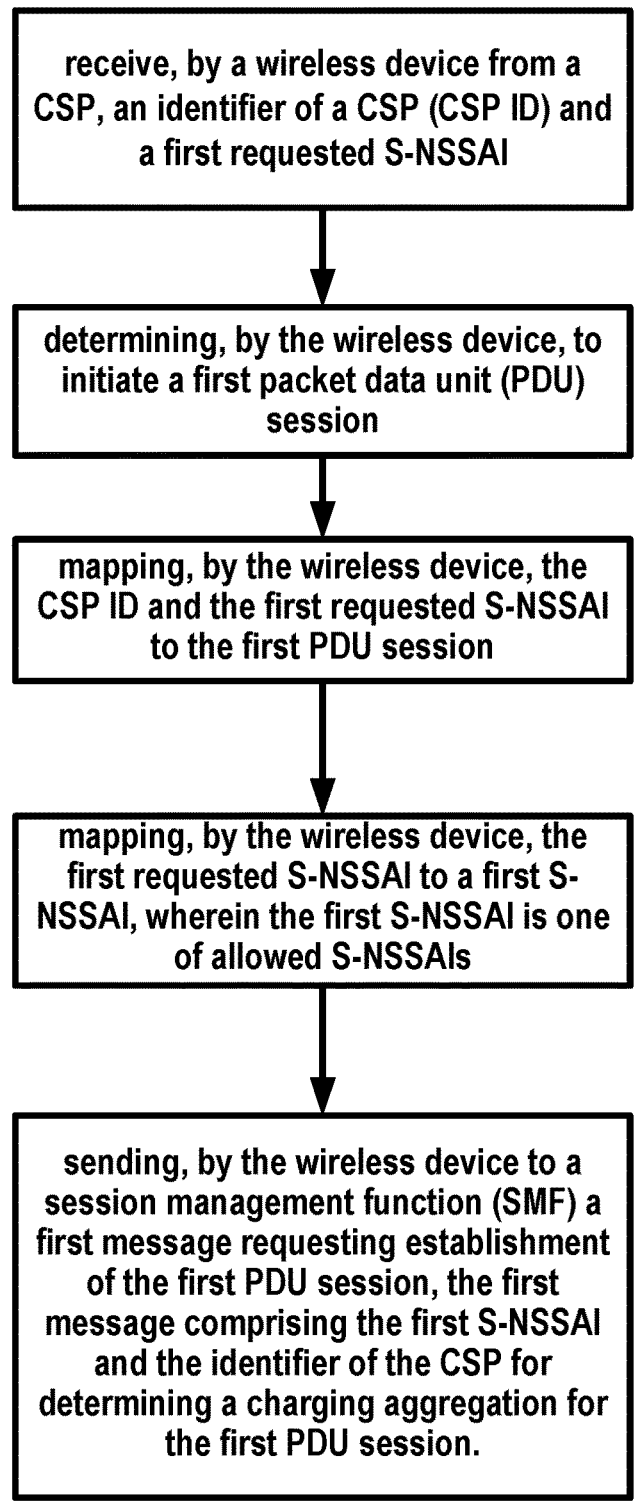
FIG. 14 is an example diagram depicting the procedures of SMF as per an aspect of an embodiment of the present disclosure.
Figure 15:
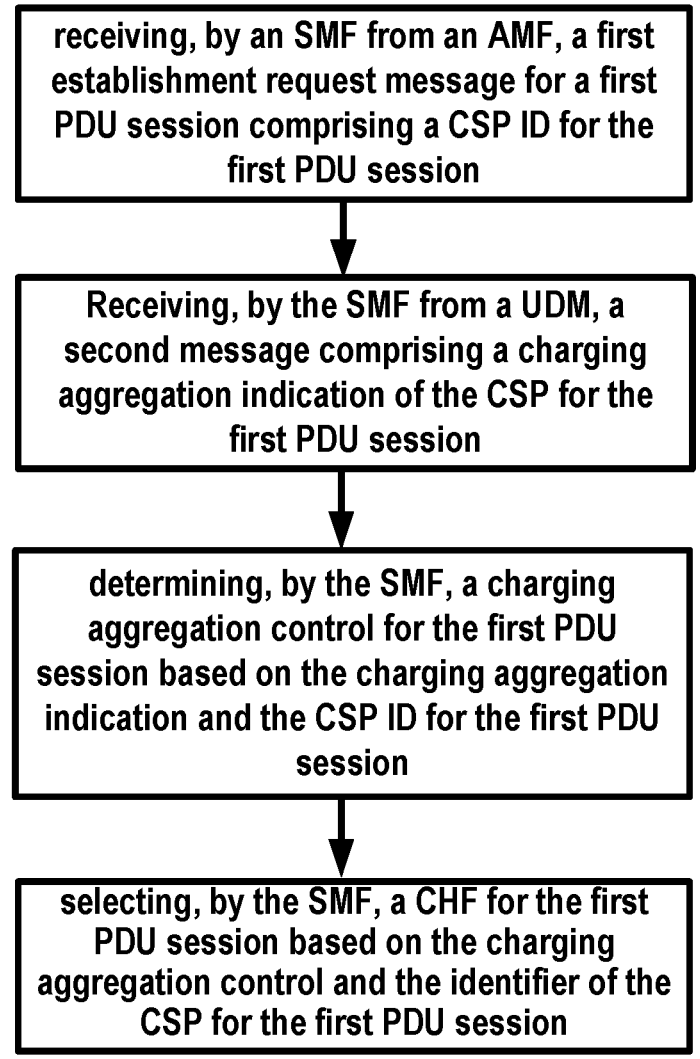
FIG. 15 is an example call flow as per an aspect of an embodiment of the present disclosure.

In response to the first charging data response, the SMF may enforce the quota control per CSP with one or more actions. In an example action, the SMF may select a UPF per CSP based on the charging aggregation control. In an example action, the SMF may determine at least one of the following user plane rules for the first PDU session based on the first quota per CSP: at least one packet detection rule; at least one forwarding action rule; at least one QoS enforcement rule; or at least one usage reporting rule. In an example action, the SMF may send to the UPF a message comprising the at least one user plane rules. FIG. 13 is an example diagram depicting the procedures of UE as per an aspect of an embodiment of the present disclosure. FIG. 14 is an example diagram depicting the procedures of SMF as per an aspect of an embodiment of the present disclosure.

In an example action, based on the subscription information received from the UDM and/or NSSF, and/or local operator policy and/or the information received from the AMF, and/or the determined charging aggregation control per CSP, the SMF may make policy decision for charging aggregation control, e.g. the SMF may determine PCC rules (e.g. QoS rules, traffic steering rules) and/or charging control rules for charging aggregation control per CSP for the UE and/or one or more PDU sessions and/or one or more S-NSSAIs and/or one or more network slice instances of the one or more S-NSSAIs. In an example, the SMF may determine QoS rules per CSP. In an example, the SMF may determine traffic steering rules per CSP. In an example, the SMF may determine charging control rules per CSP, wherein the SMF may determine a charging rate per CSP, and/or the SMF may determine a CHF per CSP. The SMF may derive user plane rules based on the PCC rules and/or charging control rules for charging aggregation control per CSP and may send the user plane rules to the UPF for enforcement.

In an example in FIG. 12, the UE may receive the CSP ID and/or requested network slice information from the CSP and/or the AF, wherein the requested network slice information may comprise one or more S-NSSAIs and/or one or more NSI IDs of the one or more S-NSSAIs, this may trigger UE to initiate at least one second PDU session per CSP in FIG. 13.

In an example, after UE has established at least one PDU session in FIG. 12, the UE may receive the CSP ID and/or second requested network slice information from the CSP and/or the AF, wherein the second requested network slice information may comprise one or more S-NSSAIs and/or one or more NSI IDs of the one or more S-NSSAIs. In an example, the UE may receive from the CSP and/or the AF a parameter requesting establishment at least one second PDU session for the requested network slice information and/or the CSP ID. The information received from the from the CSP and/or the AF may trigger UE initiate at least one second PDU session per CSP in FIG. 13. In an example, second requested network slice information may comprise a second requested S-NSSAI for the CSP. In an example, the second requested S-NSSAI is the same as the first requested S-NSSAI, in this case, the CSP and/or AF may request the same kind of network slice type but different NSI IDs mapping to different PDU sessions (e.g. 3 PDU sessions with the same S-NSSAI but NSI ID 1 for first PDU session; NSI ID 2 for second PDU session and NSI ID 3 for third PDU session). In an example, the second requested S-NS-SAI is different from the first requested S-NSSAI (e.g. first requested S-NSSAI maps to the first PDU session, and second requested S-NSSAI maps to the second PDU session).

In an example, the UE may determine to initiate a second PDU session and map the CSP ID and/or the second requested S-NSSAI to a second PDU session where the second PDU session may be identified by a second PDU session ID. In an example, the UE may map the CSP ID and/or the requested network slice information (e.g. the second requested S-NSSAI) to a second network slice instance where the second network slice instance is identified by second S-NSSAI(s) and/or a second network slice instance identifier(s) (NSI ID(s)) of the second S-NSSAI(s).

The UE may send to an AMF a second NAS message comprising at least one of: a second S-NSSAI(s) and/or the second NSI ID(s) of the second S-NSSAI(s), the second DNN, the second PDU session ID, Request type, or N1 SM container (PDU session establishment request). The second PDU session establishment request message may comprise at least one of: the second PDU session ID, Requested PDU Session Type, or a Requested SSC mode, etc. In an example, the NAS message may comprise the CSP ID for the second PDU session. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the second NAS message.

In response to the second NAS message received from the UE, the AMF may select the same SMF per CSP for the second PDU session and/or the second S-NSSAI(s) and/or the second NSI ID(s) of the second S-NSSAI(s), wherein the SMF has already served at least one PDU session (e.g. the first PDU session) for the CSP. The AMF may send to the SMF a second message (e.g. PDUSession_CreateSMContext Request) comprising at least one of: a SUPI, the second DNN, the second S-NSSAI(s) and/or the second NSI ID(s) of the second S-NSSAI(s), the second PDU session ID, AMF ID, Request Type, Priority Access, N1 SM container (PDU Session Establishment Request), User location information, Access Type, PEI). In response to the PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)). In an example, the SMF may use the subscription information received from the UDM and/or NSSF during the first PDU session establishment in FIG. 12. In an example, the SMF may send to the UDM and/or NSSF a second subscription message (e.g. subscription retrieval request, or Nnssf_NSSelection_Get) requesting user subscription information, the interaction between the SMF and the UDM and/or NSSF may refer to the interaction during the first PDU session establishment.

In an example, the SMF may determine charging aggregation control per CSP applied to the second S-NSSAI and/or the second NSI ID of the second S-NSSAI and/or the second PDU session, and the determining may be based on the CSP ID and/or the second S-NSSAI and/or the second NSI ID of the second S-NSSAI received from the AMF and/or the information received from the UDM and/or NSSF.

In an example action, based on the charging aggregation control per CSP determined by the SMF, the SMF may determine/select the same CHF per CSP for the first PDU session and the second PDU session, and/or for the first S-NSSAI and/or the first NSI ID of the first S-NSSAI and the second S-NSSAI and/or the second NSI ID of the second S-NSSAI. The SMF may send to the CHF a message (e.g. a second charging data request) comprising at least one of: the CSP ID for the second PDU session; the second PDU session ID; the charging aggregation indication applied to the CSP; or the second S-NSSAI and/or the second NSI ID of the second S-NSSAI applied to the CSP.

In response to the first charging data request message, based on the information received from the SMF, the CHF may determine a second quota per CSP for charging aggregation of first PDU session and second PDU session, and/or for the charging aggregation of the first S-NSSAI and/or the first NSI ID of the first S-NSSAI and the second S-NSSAI and/or the second NSI ID of the second S-NSSAI. In an example, the second quota per CSP may comprise at least one of: a granted unit; a time quota threshold; or a volume quota threshold. The CHF may send to the CHF a second response message (e.g. second charging data response) comprising the second quota per CSP.

In response to the second charging data response, and based on the charging aggregation control, the SMF may enforce the quota control per CSP with one or more actions. In an example action, the SMF may select the same UPF per CSP for first PDU session and second PDU session, and/or for the first S-NSSAI and/or the first NSI ID of the first S-NSSAI and the second S-NSSAI and/or the second NSI ID of the second S-NSSAI. In an example action, the SMF may determine at least one of the following user plane rules for the second PDU session based on the second quota per CSP: at least one packet detection rule; at least one forwarding action rule; at least one QoS enforcement rule; or at least one usage reporting rule. The SMF may update the user plane rules for the second PDU session. In an example action, the SMF may send to the UPF a message comprising the at least one user plane rules for the first PDU session and/or the second PDU session.

In response to the message(s) received from the SMF, the UPF may enforce the user plane rules for the first PDU session and/or the second PDU session. In an example, the UPF may measure the usage (e.g. time usage and/or volume usage) of the first PDU session and/or the second PDU session per CSP and report the total usage of CSP to the SMF when a threshold is reached, where the threshold may be in the user plane rule. The SMF may send to the CHF charging data request message(s) for the first PDU session and/or the second PDU session comprising the usage report(s) of the CSP for the first PDU session and/or the second PDU. The CHF may perform the charging aggregate per CSP accordingly.

Figure 16:
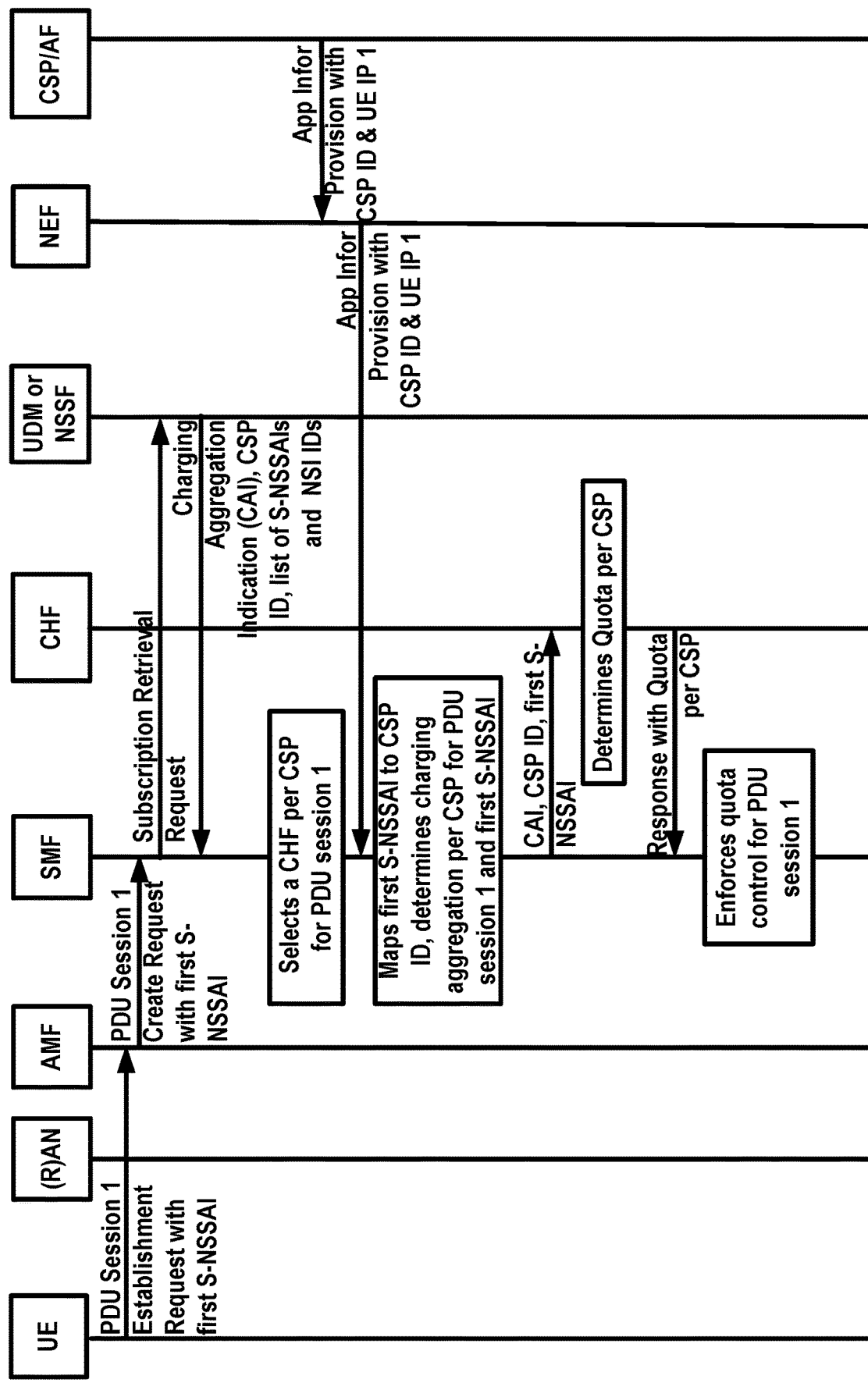
FIG. 16 is an example call flow as per an aspect of an embodiment of the present disclosure.
Figure 17:
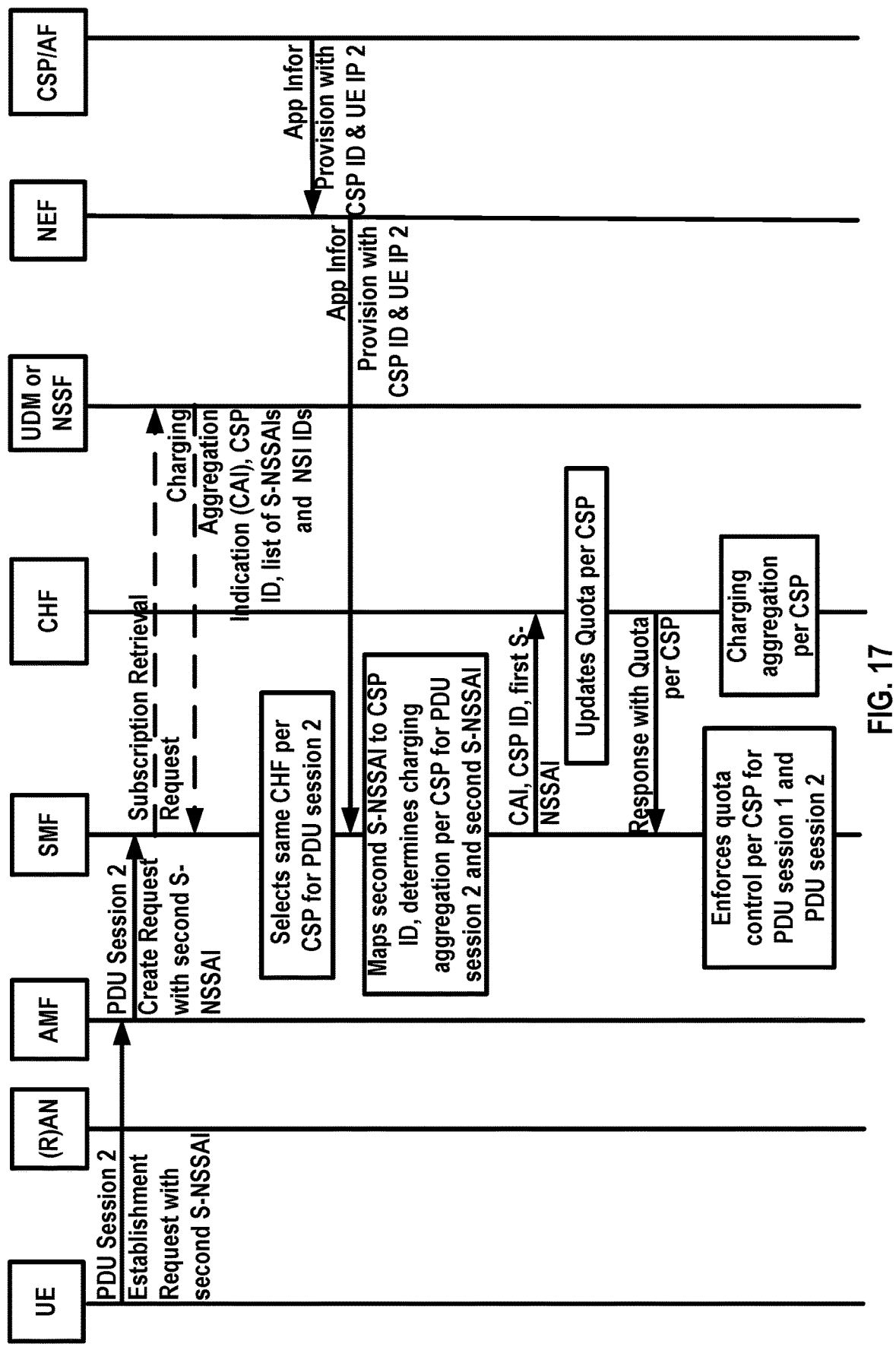
FIG. 17 is an example call flow as per an aspect of an embodiment of the present disclosure.

In an example, an SMF may receive a CSP ID from a CSP/AF via a NEF. FIG. 16 and FIG. 17 shows example call flows which may comprise one or more actions.

A UE may send to an AMF a first NAS message comprising at least one of: a first S-NSSAI(s) and/or the first NSI ID(s) of the first S-NSSAI(s), a first DNN, a first PDU session ID, Request type, or N1 SM container (PDU session establishment request). The UE may initiate a UE requested PDU session establishment procedure by transmitting a first PDU session establishment request message within the N1 SM container of the NAS message. The first PDU session establishment request message may comprise at least one of: the first PDU session ID, Requested PDU Session Type, or a Requested SSC mode, etc. In an example, the UE may transmit the NAS message via a RAN node (e.g. gNB, eNB, base station). The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the first NAS message.

In response to the NAS message received from the UE, the AMF may select an SMF and send to the selected SMF a first message (e.g. PDUSession_CreateSMContext Request) comprising at least one of: SUPI, the first DNN, the first S-NSSAI(s) and/or the first NSI ID(s) of the first S-NSSAI(s), the first PDU session ID, AMF ID, Request Type, Priority Access, N1 SM container (PDU Session Establishment Request), User location information, Access Type, PEI). The message sent to the SMF may be used by the AMF to request establishing the PDU session. In response to the PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)). The SMF may send to a UDM and/or NSSF a message (e.g. subscription retrieval request, or Nnssf_NSSelection_Get) requesting user subscription information. The subscription retrieval request/Nnssf_NSSelection_Get message sent to the UDM and/or the NSSF may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; the first DNN, the first S-NSSAI(s) and/or the first NSI ID(s) of the first S-NSSAI(s), the first PDU session ID, user location information, or information of the SMF for the PDU session (e.g. SMF identifier, IP address or FQDN of the SMF).

In response to the subscription retrieval request/Nnssf_NSSelection_Get message received from the SMF, the UDM and/or the NSSF may take one or more actions. In an example action, the UDM and/or the NSSF may determine that a charging aggregation control per CSP is applied to a wireless device and/or network slice(s) and/or a PDU session, wherein the wireless device may be identified by the at least one UE identity, the CSP may be identified by an identifier of the CSP (e.g. CSP ID), the network slice(s) may be identified by the first S-NSSAI(s) and/or the first NSI ID(s) of the first S-NSSAI(s), and the PDU session may be identified by the first PDU session ID. In an example, the UDM and/or the NSSF may determine the charging aggregation control per CSP based on the operator policy, the local policy and/or the configuration. In an example, the user subscription information may comprise an indication that the charging aggregation control is applied to the CSP ID for the wireless device, and the UDM and/or the NSSF may determine the charging aggregation control per CSP based on the user subscription information. In an example, the UDM and/or the NSSF may determine a charging aggregation indication to indicate the charging aggregation control per CSP. In an example, the UDM and/or the NSSF may determine a list of network slices and/or network slice instances applied to the charging aggregation control per CSP. In an example, the list of network slices and/or network slice instances may comprise at least one S-NSSAI and/or at least one NSI ID of the at least one S-NSSAI. In an example, the at least one S-NSSAI may a subscribed S-NSSAI. In an example, the at least one S-NSSAI may be one of allowed NSSAI. In an example, the at least one S-NSSAI and/or at least one NSI ID of the at least one S-NSSAI may comprise: a first S-NSSAI with an SST value of eMBB and an NSI ID 1 of the first S-NSSAI, and/or a second S-NSSAI with an SST value of URLLC and an NSI ID 2 of the second S-NSSAI, and/or a third S-NSSAI with an SST value of MIoT and an NSI ID 1 of the third S-NSSAI.

In an example action, the UDM and/or NSSF may send to the SMF a response message (e.g. subscription retrieval response, or Nnssf_NSSelection_Get response) comprising at least one of: the CSP ID for the first PDU session; the charging aggregation indication applied to the CSP; and/or the list of network slices and/or network slice instances applied to the CSP.

In response to the subscription retrieval response message received from the UDM, the SMF may determine/select a CHF per CSP for the first PDU session and/or the first S-NSSAI and/or the first NSI ID of the first S-NSSAI. The SMF may send to the CHF a message (e.g. a first charging data request [initial]) to initiate a charging session for the first PDU session and/or the first S-NSSAI and/or the first NSI ID of the first S-NSSAI.

A CSP and/or an AF may send to the SMF a message (e.g. application/service information provision) providing application/service information to the UE. The application/service information provision message may be sent to the SMF via a NEF. The application/service information provision message may comprise at least one of: the CSP ID, the at least one UE IP address (e.g. UE IPv4 address and/or UE IPv6 network prefix), the first DNN, and the application/ service information. The application/service information may comprise one or more of the following information elements: IP filter information to identify a service data flow of the application service, an application identifier, a media/ application/service type, and requested media/application/ service QoS (e.g. 5QI, ARP, and/or bandwidth).

In response to the application/service information provision message received from the CSP and/or an AF, the SMF may take one or more actions. In an example action, the SMF may map the CSP ID and/or the application/service information to a PDU session and/or network slice(s) based on the at least one UE IP address and/or the first DNN, e.g. the at least one UE IP address and/or the first DNN received from the CSP and/or an AF is(are) the same as the one(s) received from the AMF, and/or the at least one UE IP address received from the CSP and/or an AF is the same as the at least one UE IP address of the first PDU session allocated by the SMF. In an example, the SMF may map the CSP ID and/or the application/service information to the first PDU session and/or the first S-NSSAI and/or the first NSI ID of the first S-NSSAI. In an example, the SMF may map the first PDU session and/or the first S-NSSAI and/or the first NSI ID of the first S-NSSAI to the CSP ID.

In an example action, based on the subscription information received from the UDM and/or NSSF, and/or local operator policy and/or the information received from the AMF, and/or the information received from the CSP and/or an AF, the SMF may determine charging aggregation control per CSP applied to the UE and/or network slice(s) and/or the PDU session. In an example, the SMF may determine charging aggregation control per CSP applied to the first S-NSSAI and/or the first NSI ID of the first S-NSSAI and/or the first PDU session, and the determining may be based on at least one of: the first S-NSSAI and/or the first NSI ID of the first S-NSSAI received from the AMF; the information received from the UDM and/or NSSF (e.g. the CSP ID for the first PDU session; the charging aggregation indication applied to the CSP; and/or the list of network slices and/or network slice instances applied to the CSP); the information received from the CSP and/or an AF (e.g. CSP ID); or the mapping of the first PDU session and/or the first S-NSSAI and/or the first NSI ID of the first S-NSSAI to the CSP ID. In an example, based on the mapping of the first PDU session and/or the first S-NSSAI and/or the first NSI ID of the first S-NSSAI to the CSP ID, and based on the list of network slices and/or network slice instances applied to the CSP, the SMF may determine charging aggregation control per CSP applied to the first S-NSSAI and/or the first NSI ID of the first S-NSSAI and/or the first PDU session.

In an example action, the SMF may send to the CHF a message (e.g. a first charging data request[update]) comprising at least one of: the CSP ID for the first PDU session; the first PDU session ID; the charging aggregation indication applied to the CSP; or the first S-NSSAI and/or the first NSI ID of the first S-NSSAI applied to the CSP.

In response to the first charging data request message, the CHF may determine a first quota per CSP for charging aggregation based on the information received from the SMF (e.g. the CSP ID; the charging aggregation indication applied to the CSP; or the first S-NSSAI and/or the first NSI ID of the first S-NSSAI applied to the CSP). In an example, the first quota per CSP may comprise at least one of: a granted unit; a time quota threshold; or a volume quota threshold. The CHF may send to the CHF a first response message (e.g. first charging data response) comprising the first quota per CSP.

In response to the first charging data response, the SMF may enforce the quota control per CSP with one or more actions. In an example action, the SMF may select a UPF per CSP based on the charging aggregation control. In an example action, the SMF may determine at least one of the following user plane rules for the first PDU session based on the first quota per CSP: at least one packet detection rule; at least one forwarding action rule; at least one QoS enforcement rule; or at least one usage reporting rule. In an example action, the SMF may send to the UPF a message comprising the at least one user plane rules.

In an example, after UE has established at least one PDU session in FIG. 16, the UE may initiate at least one second PDU session per CSP in FIG. 17. The UE may send to an AMF a second NAS message comprising at least one of: second S-NSSAI(s) and/or the second NSI ID(s) of the second S-NSSAI(s), a second DNN, a second PDU session ID, Request type, or N1 SM container (PDU session establishment request). The second PDU session establishment request message may comprise at least one of: the second PDU session ID, Requested PDU Session Type, or a Requested SSC mode, etc. In an example, the NAS message may comprise the CSP ID for the second PDU session. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the second NAS message.

In response to the second NAS message received from the UE, the AMF may select the same SMF per CSP for the second PDU session and/or the second S-NSSAI(s) and/or the second NSI ID(s) of the second S-NSSAI(s), wherein the SMF has already served at least one PDU session (e.g. the first PDU session) for the CSP. The AMF may send to the SMF a second message (e.g. PDUSession_CreateSMContext Request) comprising at least one of: SUPI, the second DNN, the second S-NSSAI(s) and/or the second NSI ID(s) of the second S-NSSAI(s), the second PDU session ID, AMF ID, Request Type, Priority Access, N1 SM container (PDU Session Establishment Request), User location information, Access Type, PEI). In response to the PDUSession_ CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)). In an example, the SMF may use the subscription information received from the UDM and/or NSSF during the first PDU session establishment in FIG. 16. In an example, the SMF may send to the UDM and/or NSSF a second subscription message (e.g. subscription retrieval request, or Nnssf_NSSelection_Get) requesting user subscription information, the interaction between the SMF and the UDM and/or NSSF may refer to the interaction during the first PDU session establishment.

The CSP and/or the AF may send to the SMF a second message (e.g. a second application/service information provision) providing application/service information to the UE. The second application/service information provision message may be sent to the SMF via a NEF. The second application/service information provision message may comprise at least one of: the CSP ID, a second UE IP address (e.g. UE IPv4 address and/or UE IPv6 network prefix), the second DNN, and second application/service information. The second application/service information may comprise one or more of the following information elements: IP filter information to identify a service data flow of the application service, an application identifier, a media/application/service type, and requested media/application/service QoS (e.g. 5QI, ARP, and/or bandwidth).

In response to the second application/service information provision message received from the CSP and/or an AF, the SMF may take one or more actions. In an example action, the SMF may map the CSP ID and/or the second application/service information to a PDU session and/or network slice(s) based on the second UE IP address and/or the second DNN, e.g. the second UE IP address and/or the second DNN received from the CSP and/or an AF is(are) the same as the one(s) received from the AMF, and/or the second UE IP address received from the CSP and/or an AF is the same as the second UE IP address of the second PDU session allocated by the SMF. In an example, the SMF may map the CSP ID and/or the second application/service information to the second PDU session and/or the second S-NSSAI and/or the second NSI ID of the second S-NSSAI. In an example, the SMF may map the second PDU session and/or the second S-NSSAI and/or the second NSI ID of the second S-NSSAI to the CSP ID.

In an example action, based on the subscription information received from the UDM and/or NSSF, and/or local operator policy and/or the information received from the AMF, and/or the information received from the CSP and/or an AF, the SMF may determine charging aggregation control per CSP applied to the second S-NSSAI and/or the second NSI ID of the second S-NSSAI and/or the second PDU session, and the determining may be based on at least one of: the second S-NSSAI and/or the second NSI ID of the second S-NSSAI received from the AMF; the information received from the UDM and/or NSSF; the information received from the CSP and/or an AF (e.g. CSP ID); or the mapping of the second PDU session and/or the second S-NSSAI and/or the second NSI ID of the second S-NSSAI to the CSP ID. In an example, based on the mapping of second PDU session and/or the second S-NSSAI and/or the second NSI ID of the second S-NSSAI to the CSP ID, and based on the list of network slices and/or network slice instances applied to the CSP, the SMF may determine charging aggregation control per CSP applied to the second S-NSSAI and/or the second NSI ID of the second S-NSSAI and/or the second PDU session.

In an example action, based on the charging aggregation control per CSP determined by the SMF, the SMF may determine/select the same CHF per CSP for the first PDU session and the second PDU session, and/or for the first S-NSSAI and/or the first NSI ID of the first S-NSSAI and the second S-NSSAI and/or the second NSI ID of the second S-NSSAI. The SMF may send to the CHF a message (e.g. a second charging data request) comprising at least one of: the CSP ID for the second PDU session; the second PDU session ID; the charging aggregation indication applied to the CSP; or the second S-NSSAI and/or the second NSI ID of the second S-NSSAI applied to the CSP.

In response to the first charging data request message, based on the information received from the SMF, the CHF may determine a second quota per CSP for charging aggregation of first PDU session and second PDU session, and/or for the charging aggregation of the first S-NSSAI and/or the first NSI ID of the first S-NSSAI and the second S-NSSAI and/or the second NSI ID of the second S-NSSAI. In an example, the second quota per CSP may comprise at least one of: a granted unit; a time quota threshold; or a volume quota threshold. The CHF may send to the CHF a second response message (e.g. second charging data response) comprising the second quota per CSP.

In response to the second charging data response, and based on the charging aggregation control, the SMF may enforce the quota control per CSP with one or more actions. In an example action, the SMF may select the same UPF per CSP for the first PDU session and the second PDU session, and/or for the first S-NSSAI and/or the first NSI ID of the first S-NSSAI and the second S-NSSAI and/or the second NSI ID of the second S-NSSAI. In an example action, the SMF may determine at least one of the following user plane rules for the second PDU session based on the second quota per CSP: at least one packet detection rule; at least one forwarding action rule; at least one QoS enforcement rule; or at least one usage reporting rule. The SMF may update the user plane rules for the second PDU session. In an example action, the SMF may send to the UPF a message comprising the at least one user plane rules for the first PDU session and/or the second PDU session.

In response to the message(s) received from the SMF, the UPF may enforce the user plane rules for the first PDU session and/or the second PDU session. In an example, the UPF may measure the usage (e.g. time usage and/or volume usage) of the first PDU session and/or the second PDU session per CSP and report the total usage of CSP to the SMF when a threshold is reached, where the threshold may be in the user plane rule. The SMF may send to the CHF charging data request message(s) for the first PDU session and/or the second PDU session comprising the usage report(s) of the CSP for the first PDU session and/or the second PDU. The CHF may perform the charging aggregate per CSP accordingly.

Figure 18:
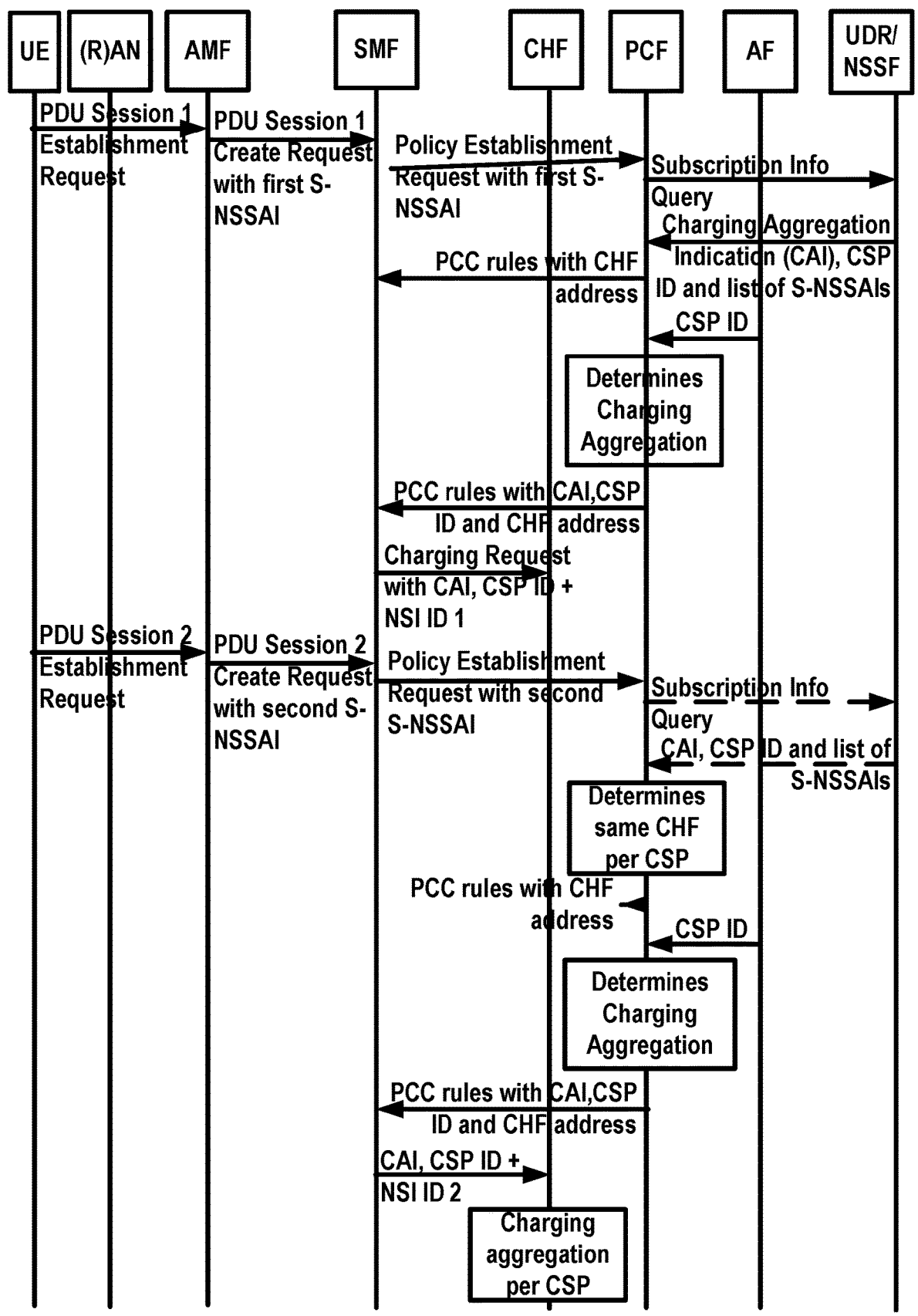
FIG. 18 is an example call flow as per an aspect of an embodiment of the present disclosure.

FIG. 18 shows example call flows which may comprise one or more actions. An SMF may receive from a UE a first message (e.g. first PDUSession_CreateSMContext Request) via an AMF requesting establishment of a first PDU session. The first PDUSession_CreateSMContext Request message may comprise at least one of: a SUPI, a first DNN, first S-NSSAI(s) and/or first NSI ID(s) of the first S-NSSAI(s), first PDU session ID, an AMF ID, Request Type, Priority Access, N1 SM container (PDU Session Establishment Request), User location information, Access Type, PEI). In response to the first PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)).

The SMF may send to a PCF a message (e.g. first policy establishment request) comprising at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; the first DNN, the first S-NSSAI(s) and/or the first NSI ID(s) of the first S-NSSAI(s), the first PDU session ID, user location information, or information of the SMF for the PDU session (e.g. SMF identifier, IP address or FQDN of the SMF). In response to the first policy establishment request message received from the SMF, the PCF may send to a UDR and/or NSSF a message (e.g. subscription retrieval request, or Nnssf_NSSelection_Get) requesting user subscription information. The subscription retrieval request/Nnssf_NSSelection_Get message sent to the UDR and/or the NSSF may comprise at least one of: the at least one UE identity (e.g. SUPI, PEI, and/or GPSI), the at least one first UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); the PLMN identifier; the application identifier; the allocated application instance identifier; the first DNN, the first S-NSSAI(s) and/or the first NSI ID(s) of the first S-NSSAI(s), the first PDU session ID, user location information, or information of the SMF for the PDU session (e.g. SMF identifier, IP address or FQDN of the SMF).

In response to the subscription retrieval request/Nnssf_NSSelection_Get message received from the PCF, the UDR and/or the NSSF may take one or more actions. In an example action, the UDR and/or the NSSF may determine that a charging aggregation control per CSP is applied to a wireless device and/or network slice(s) and/or a PDU session, wherein the wireless device may be identified by the at least one UE identity, the CSP may be identified by an identifier of the CSP (e.g. CSP ID), the network slice(s) may be identified by the first S-NSSAI(s) and/or the first NSI ID(s) of the first S-NSSAI(s), and the PDU session may be identified by the first PDU session ID. In an example, the UDR and/or the NSSF may determine the charging aggregation control per CSP based on the operator policy, the local policy and/or the configuration. In an example, the user subscription information may comprise an indication that the charging aggregation control is applied to the CSP ID for the wireless device, and the UDR and/or the NSSF may determine the charging aggregation control per CSP based on the user subscription information. In an example, the UDR and/or the NSSF may determine a charging aggregation indication to indicate the charging aggregation control per CSP. In an example, the UDR and/or the NSSF may determine a list of network slices and/or network slice instances applied to the charging aggregation control per CSP. In an example, the list of network slices and/or network slice instances may comprise at least one S-NSSAI and/or at least one NSI ID of the at least one S-NSSAI. In an example, the at least one S-NSSAI may a subscribed S-NSSAI. In an example, the at least one S-NSSAI may be one of allowed NSSAI. In an example, the at least one S-NSSAI and/or at least one NSI ID of the at least one S-NSSAI may comprise: a first S-NSSAI with an SST value of eMBB and an NSI ID 1 of the first S-NSSAI, and/or a second S-NSSAI with an SST value of URLLC and an NSI ID 2 of the second S-NSSAI, and/or a third S-NSSAI with an SST value of MIoT and an NSI ID 1 of the third S-NSSAI.

In an example action, the UDR and/or NSSF may send to the PCF a response message (e.g. subscription retrieval response, or Nnssf_NSSelection_Get response) comprising at least one of: the CSP ID for the first PDU session; the charging aggregation indication applied to the CSP; and/or the list of network slices and/or network slice instances applied to the CSP.

In response to the subscription retrieval response message received from the UDR and/or NSSF, the PCF may determine/select a CHF per CSP for the first PDU session and/or the first S-NSSAI and/or the first NSI ID of the first S-NSSAI. The PCF may send to the SMF a response message (e.g. a first policy establishment response) comprising at least one PCC rule, wherein the at least one PCC rule may comprise an address of the CHF.

A CSP and/or an AF may send to the PCF a first message (e.g. first application/service information provision) providing application/service information to the PCF. The first application/service information provision message may be sent to the PCF via a NEF. The first application/service information provision message may comprise at least one of: the CSP ID, the at least one first UE IP address (e.g. UE IPv4 address and/or UE IPv6 network prefix), the first DNN, and the first application/service information. The first application/service information may comprise one or more of the following information elements: IP filter information to identify a service data flow of the application service, an application identifier, a media/application/service type, and requested media/application/service QoS (e.g. 5QI, ARP, and/or bandwidth).

In response to the first application/service information provision message received from the CSP and/or an AF, the PCF may take one or more actions. In an example action, the PCF may map the CSP ID and/or the application/service information to a PDU session and/or network slice(s) based on the at least one first UE IP address and/or the first DNN, e.g. the at least one first UE IP address and/or the first DNN received from the CSP and/or an AF is(are) the same as the one(s) received from the SMF. In an example, the PCF may map the CSP ID and/or the application/service information to the first PDU session and/or the first S-NSSAI and/or the first NSI ID of the first S-NSSAI. In an example, the PCF may map the first PDU session and/or the first S-NSSAI and/or the first NSI ID of the first S-NSSAI to the CSP ID.

In an example action, based on the subscription information received from the UDM and/or NSSF, and/or local operator policy and/or the information received from the SMF, and/or the information received from the CSP and/or an AF, the PCF may determine charging aggregation control per CSP for the UE and/or network slice(s) and/or the PDU session. In an example, the PCF may determine charging aggregation control per CSP applied to the first S-NSSAI and/or the first NSI ID of the first S-NSSAI and/or the first PDU session, and the determining may be based on at least one of: the first S-NSSAI and/or the first NSI ID of the first S-NSSAI received from the SMF; the information received from the UDM and/or NSSF (e.g. the CSP ID for the first PDU session; the charging aggregation indication applied to the CSP; and/or the list of network slices and/or network slice instances applied to the CSP); the information received from the CSP and/or an AF (e.g. CSP ID); or the mapping of the first PDU session and/or the first S-NSSAI and/or the first NSI ID of the first S-NSSAI to the CSP ID. In an example, based on the mapping of the first PDU session and/or the first S-NSSAI and/or the first NSI ID of the first S-NSSAI to the CSP ID, and based on the list of network slices and/or network slice instances applied to the CSP, the PCF may determine charging aggregation control per CSP applied to the first S-NSSAI and/or the first NSI ID of the first S-NSSAI and/or the first PDU session.

In an example action, based on the subscription information received from the UDM and/or NSSF, and/or local operator policy and/or the information received from the SMF, and/or the information received from the CSP and/or an AF, and/or the determined charging aggregation control, the PCF may make policy decision for charging aggregation control, e.g. the PCF may determine PCC rules (e.g. QoS rules, traffic steering rules) and/or charging control rules for charging aggregation control per CSP for the UE and/or one or more PDU sessions and/or one or more S-NSSAIs and/or one or more network slice instances of the one or more S-NSSAIs. In an example, the PCF may determine QoS rules per CSP. In an example, the PCF may determine traffic steering rules per CSP. In an example, the PCF may determine charging control rules per CSP, wherein the PCF may determine a charging rate per CSP, and/or the PCF may determine a CHF per CSP.

In an example action, the PCF may send to the SMF a message (e.g. policy association modification request) comprising at least one of: the PCC rules and/or charging control rules for charging aggregation control per CSP; the CSP ID for the first PDU session; the charging aggregation indication applied to the CSP; or the first S-NSSAI and/or the first NSI ID of the first S-NSSAI applied to the CSP.

In response to the policy association modification request message received from the PCF, the SMF may take one or more actions. In an example action, the SMF may send to the CHF a message (e.g. a first charging data request) comprising at least one of: the CSP ID for the first PDU session; the first PDU session ID; the charging aggregation indication applied to the CSP; or the first S-NSSAI and/or the first NSI ID of the first S-NSSAI applied to the CSP.

In response to the first charging data request message, the CHF may determine a first quota per CSP for charging aggregation based on the information received from the SMF (e.g. the CSP ID; the charging aggregation indication applied to the CSP; or the first S-NSSAI and/or the first NSI ID of the first S-NSSAI applied to the CSP). In an example, the first quota per CSP may comprise at least one of: a granted unit; a time quota threshold; or a volume quota threshold. The CHF may send to the CHF a first response message (e.g. first charging data response) comprising the first quota per CSP.

In response to the first charging data response, the SMF may enforce the quota control per CSP with one or more actions. In an example action, the SMF may select a UPF per CSP based on the charging aggregation control. In an example action, the SMF may determine at least one of the following user plane rules for the first PDU session based on the first quota per CSP: at least one packet detection rule; at least one forwarding action rule; at least one QoS enforcement rule; or at least one usage reporting rule. In an example action, the SMF may send to the UPF a message comprising the at least one user plane rules.

In an example, after UE has established at least one PDU session, the UE may initiate at least one second PDU session. The procedure of the second PDU session establishment is the same as the first PDU session except one or more of the following actions. In an example action, the PCF may use the subscription information received from the UDR and/or NSSF during the first PDU session establishment. In an example, the PCF may send to the UDR and/or NSSF a second subscription message requesting user subscription information, the interaction between the PCF and the UDR and/or NSSF may refer to the interaction during the first PDU session establishment. In an example action, based on the charging aggregation control per CSP determined by the PCF, the PCF may determine/select the same CHF per CSP for the first PDU session and the at least one second PDU session, and/or for the first S-NSSAI and/or the first NSI ID of the first S-NSSAI and second S-NSSAI and/or second NSI ID of the second S-NSSAI. In an example action, the PCF may make policy decision for charging aggregation control, e.g. the PCF may create/update PCC rules (e.g. QoS rules, traffic steering rules) and/or charging control rules for charging aggregation control per CSP for one or more PDU sessions (e.g. the first PDU session and the second PDU session) and/or one or more S-NSSAIs (e.g. the first S-NSSAI and the second S-NSSAI) and/or one or more network slice instances (e.g. the first NSI ID and the second NSI ID) of the one or more S-NSSAIs (e.g. the first S-NSSAI and the second S-NSSAI). In an example, the PCF may create/update QoS rules per CSP. In an example, the PCF may create/update traffic steering rules per CSP. In an example, the PCF may create/update charging control rules per CSP, wherein the PCF may create/update a charging rate per CSP, and/or the PCF may determine a CHF per CSP.

In an example action, the PCF may send to the SMF a second message (e.g. policy association modification request) comprising at least one of: the PCC rules and/or charging control rules for charging aggregation control per CSP; the CSP ID for the first PDU session and/or the second PDU session; the charging aggregation indication applied to the CSP; or the first S-NSSAI and/or the first NSI ID of the first S-NSSAI and/or the second S-NSSAI and/or the second NSI ID of the second S-NSSAI applied to the CSP. In an example, the SMF may enforce the PCC rules for the first PDU session and/or the second PDU session per CSP, e.g. apply 5QI/ARP/bandwidth to the first PDU session and/or the second PDU session, and/or apply the charging rate to the first PDU session and/or the second PDU session; e.g. apply 5QI/ARP/bandwidth to the first S-NSSAI and/or the first NSI ID of the first S-NSSAI and/or the second S-NSSAI and/or the second NSI ID of the second S-NSSAI, and/or apply the charging rate to the first S-NSSAI and/or the first NSI ID of the first S-NSSAI and/or the second S-NSSAI and/or the second NSI ID of the second S-NSSAI.

Figure 19:
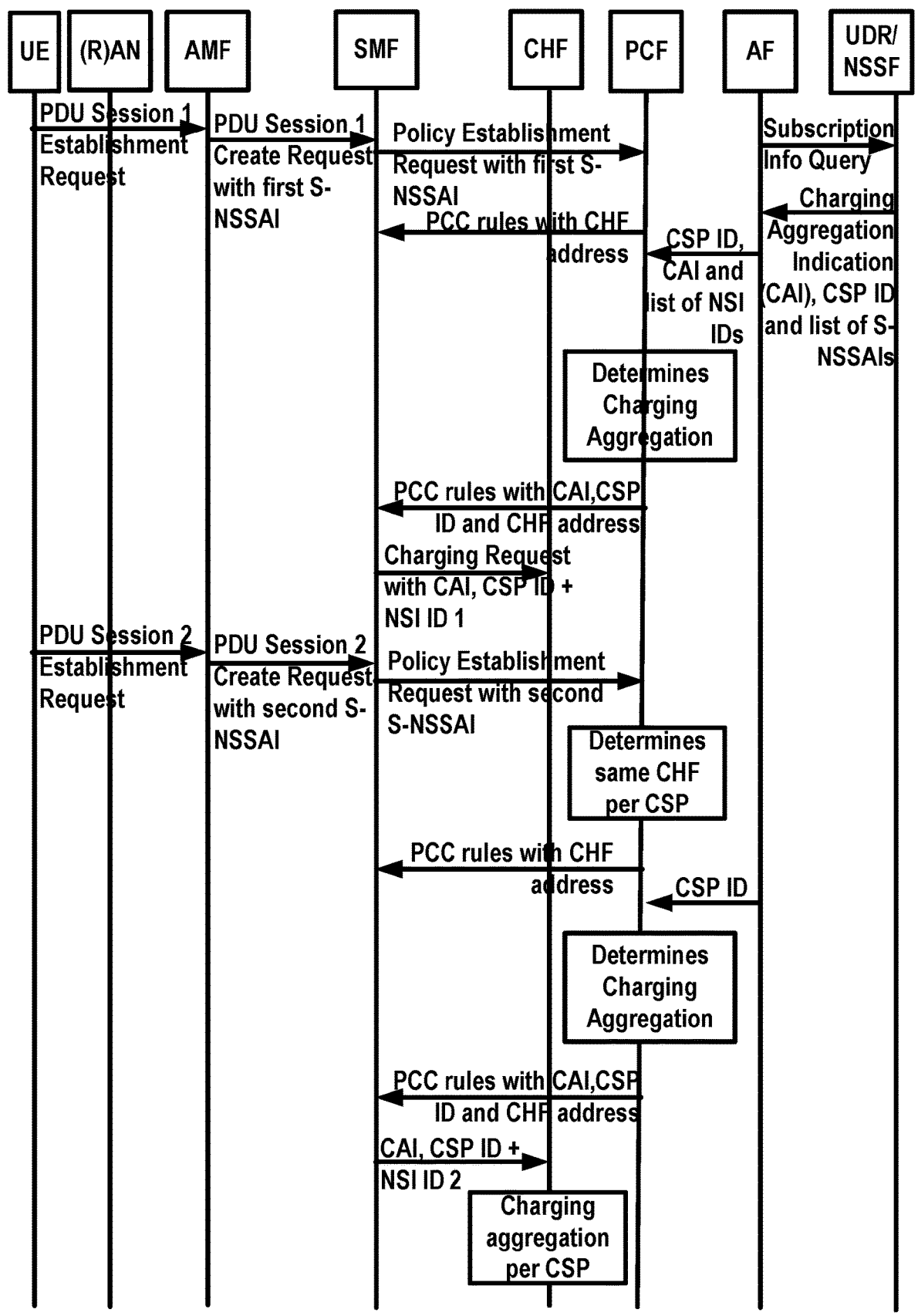
FIG. 19 is an example call flow as per an aspect of an embodiment of the present disclosure.

FIG. 19 shows example call flows which may comprise one or more actions. An SMF may receive from a UE a first message (e.g. first PDUSession_CreateSMContext Request) via an AMF requesting establishment of a first PDU session. The first PDUSession_CreateSMContext Request message may comprise at least one of: a SUPI, a first DNN, first S-NSSAI(s) and/or first NSI ID(s) of the first S-NSSAI(s), first PDU session ID, an AMF ID, Request Type, Priority Access, N1 SM container (PDU Session Establishment Request), User location information, Access Type, PEI). In response to the first PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)).

The SMF may send to a PCF a message (e.g. first policy establishment request) comprising at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured);

Access Type (e.g. 3GPP access); RAT Type (e.g. 3GPP-NR-FDD); a PLMN identifier; an application identifier; an allocated application instance identifier; the first DNN, the first S-NSSAI(s) and/or the first NSI ID(s) of the first S-NSSAI(s), the first PDU session ID, user location information, or information of the SMF for the PDU session (e.g. SMF identifier, IP address or FQDN of the SMF).

In response to the first policy establishment request message received from the SMF, the PCF may determine PCC rules comprising charging control rules and send the PCC rules to the SMF.

A CSP and/or AF may needs charging aggregation control per CSP for the UE for one or more PDU sessions and one or more network slices. The CSP and/or AF may send to a UDR and/or NSSF a message (e.g. subscription retrieval request, or Nnssf_NSSelection_Get) requesting user subscription information. The subscription retrieval request/Nnssf_NSSelection_Get message sent to the UDR and/or the NSSF may comprise at least one UE identity and/or an identifier of the CSP (e.g. CSP ID). In response to the subscription retrieval request/Nnssf_NSSelection_Get message received from the CSP and/or AF, the UDR and/or the NSSF may take one or more actions. In an example action, the UDR and/or the NSSF may determine that a charging aggregation control per CSP is applied to the wireless device and/or network slice(s) and/or PDU session(s), wherein the wireless device may be identified by the at least one UE identity, the CSP may be identified by the CSP ID, the network slice(s) may be identified by first S-NSSAI(s) and/or first NSI ID(s) of the first S-NSSAI(s), and the PDU session may be identified by PDU session IDs. In an example, the UDR and/or the NSSF may determine the charging aggregation control per CSP based on the operator policy, the local policy and/or the configuration. In an example, the user subscription information may comprise an indication that the charging aggregation control is applied to the CSP ID for the wireless device, and the UDR and/or the NSSF may determine the charging aggregation control per CSP based on the user subscription information. In an example, the UDR and/or the NSSF may determine a charging aggregation indication to indicate the charging aggregation control per CSP. In an example, the UDR and/or the NSSF may determine a list of network slices and/or network slice instances applied to the charging aggregation control per CSP. In an example, the list of network slices and/or network slice instances may comprise at least one S-NSSAI and/or at least one NSI ID of the at least one S-NSSAI. In an example, the at least one S-NSSAI may a subscribed S-NSSAI. In an example, the at least one S-NSSAI may be one of allowed NSSAI. In an example, the at least one S-NSSAI and/or at least one NSI ID of the at least one S-NSSAI may comprise: a first S-NSSAI with an SST value of eMBB and an NSI ID 1 of the first S-NSSAI, and/or a second S-NSSAI with an SST value of URLLC and an NSI ID 2 of the second S-NSSAI, and/or a third S-NSSAI with an SST value of MIoT and an NSI ID 1 of the third S-NSSAI.

In an example action, the UDR and/or NSSF may send to the CSP and/or AF a response message (e.g. subscription retrieval response, or Nnssf_NSSelection_Get response) comprising at least one of: the CSP ID for list of PDU sessions and/or list of network slices and/or network slice instances; or the charging aggregation indication applied to the CSP.

In response to the subscription retrieval response message received from the UDR and/or NSSF, and/or in response to receiving application information from the UE (e.g. UE IP address), the CSP and/or AF may send to a PCF a first message (e.g. first application/service information provision) providing application/service information to the PCF. The first application/service information provision message may be sent to the PCF via a NEF. The first application/service information provision message may comprise at least one of: the CSP ID for list of PDU sessions and/or list of network slices and/or network slice instances; the charging aggregation indication applied to the CSP, the at least one first UE IP address (e.g. UE IPv4 address and/or UE IPv6 network prefix), the first DNN, or the first application/service information. The first application/service information may comprise one or more of the following information elements: IP filter information to identify a service data flow of the application service, an application identifier, a media/application/service type, and requested media/application/service QoS (e.g. 5QI, ARP, and/or bandwidth).

In response to the first application/service information provision message received from the CSP and/or an AF, the PCF may take one or more actions. In an example action, the PCF may map the CSP ID and/or the application/service information to a PDU session and/or network slice(s) based on the at least one first UE IP address and/or the first DNN, e.g. the at least one first UE IP address and/or the first DNN received from the CSP and/or an AF is(are) the same as the one(s) received from the SMF. In an example, the PCF may map the CSP ID and/or the application/service information to the first PDU session and/or the first S-NSSAI and/or the first NSI ID of the first S-NSSAI. In an example, the PCF may map the first PDU session and/or the first S-NSSAI and/or the first NSI ID of the first S-NSSAI to the CSP ID.

In an example action, based on the local operator policy and/or the information received from the SMF, and/or the information received from the CSP and/or an AF, the PCF may determine charging aggregation control per CSP applied to network slice(s) and/or the PDU session. In an example, the PCF may determine charging aggregation control per CSP applied to the first S-NSSAI and/or the first NSI ID of the first S-NSSAI and/or the first PDU session, and the determining may be based on at least one of: the first S-NSSAI and/or the first NSI ID of the first S-NSSAI received from the SMF; the information received from the CSP and/or an AF (e.g. CSP ID); or the mapping of the first PDU session and/or the first S-NSSAI and/or the first NSI ID of the first S-NSSAI to the CSP ID. In an example, based on the mapping of the first PDU session and/or the first S-NSSAI and/or the first NSI ID of the first S-NSSAI to the CSP ID, and based on the list of network slices and/or network slice instances applied to the CSP, the PCF may determine charging aggregation control per CSP applied to the first S-NSSAI and/or the first NSI ID of the first S-NSSAI and/or the first PDU session.

In an example action, based on the local operator policy and/or the information received from the SMF, and/or the information received from the CSP and/or an AF, and/or the determined charging aggregation control per CSP, the PCF may make policy decision for charging aggregation control, e.g. the PCF may determine PCC rules (e.g. QoS rules, traffic steering rules) and/or charging control rules for charging aggregation control per CSP for the UE and/or one or more PDU sessions and/or one or more S-NSSAIs and/or one or more network slice instances of the one or more S-NSSAIs. In an example, the PCF may determine QoS rules per CSP. In an example, the PCF may determine traffic steering rules per CSP. In an example, the PCF may determine charging control rules per CSP, wherein the PCF may determine a charging rate per CSP, and/or the PCF may determine a CHF per CSP.

In an example action, the PCF may send to the SMF a message (e.g. policy association modification request) comprising at least one of: the PCC rules and/or charging control rules for charging aggregation control per CSP; the CSP ID for the first PDU session; the first PDU session ID; the charging aggregation indication applied to the CSP; or the first S-NSSAI and/or the first NSI ID of the first S-NSSAI applied to the CSP.

In response to the policy association modification request message received from the PCF, the SMF may take one or more actions. In an example action, the SMF may send to the CHF a message (e.g. a first charging data request) comprising at least one of: the CSP ID for the first PDU session; the charging aggregation indication applied to the CSP; or the first S-NSSAI and/or the first NSI ID of the first S-NSSAI applied to the CSP.

In response to the first charging data request message, the CHF may determine a first quota per CSP for charging aggregation based on the information received from the SMF (e.g. the CSP ID; the charging aggregation indication applied to the CSP; or the first S-NSSAI and/or the first NSI ID of the first S-NSSAI applied to the CSP). In an example, the first quota per CSP may comprise at least one of: a granted unit; a time quota threshold; or a volume quota threshold. The CHF may send to the CHF a first response message (e.g. first charging data response) comprising the first quota per CSP.

In response to the first charging data response, the SMF may enforce the quota control per CSP with one or more actions. In an example action, the SMF may select a UPF per CSP based on the charging aggregation control. In an example action, the SMF may determine at least one of the following user plane rules for the first PDU session based on the first quota per CSP: at least one packet detection rule; at least one forwarding action rule; at least one QoS enforcement rule; or at least one usage reporting rule. In an example action, the SMF may send to the UPF a message comprising the at least one user plane rules.

In an example, after UE has established at least one PDU session, the UE may initiate at least one second PDU session. The procedure of the second PDU session establishment is the same as the first PDU session except one or more of the following actions. In an example action, based on the charging aggregation control per CSP determined by the PCF, the PCF may determine/select the same CHF per CSP for the first PDU session and the at least one second PDU session, and/or for the first S-NSSAI and/or the first NSI ID of the first S-NSSAI and second S-NSSAI and/or second NSI ID of the second S-NSSAI. In an example action, the PCF may make policy decision for charging aggregation control, e.g. the PCF may create/update PCC rules (e.g. QoS rules, traffic steering rules) and/or charging control rules for charging aggregation control per CSP for one or more PDU sessions (e.g. the first PDU session and the second PDU session) and/or one or more S-NSSAIs (e.g. the first S-NSSAI and the second S-NSSAI) and/or one or more network slice instances (e.g. the first NSI ID and the second NSI ID) of the one or more S-NSSAIs (e.g. the first S-NSSAI and the second S-NSSAI). In an example, the PCF may create/update QoS rules per CSP. In an example, the PCF may create/update traffic steering rules per CSP. In an example, the PCF may create/update charging control rules per CSP, wherein the PCF may create/update a charging rate per CSP, and/or the PCF may determine a CHF per CSP.

In an example action, the PCF may send to the SMF a second message (e.g. policy association modification request) comprising at least one of: the PCC rules and/or charging control rules for charging aggregation control per CSP; the CSP ID for the first PDU session and/or the second PDU session; the charging aggregation indication applied to the CSP; or the first S-NSSAI and/or the first NSI ID of the first S-NSSAI and/or the second S-NSSAI and/or the second NSI ID of the second S-NSSAI applied to the CSP. In an example, the SMF may enforce the PCC rules for the first PDU session and/or the second PDU session per CSP, e.g. apply 5QI/ARP/bandwidth to the first PDU session and/or the second PDU session, and/or apply the charging rate to the first PDU session and/or the second PDU session; e.g. apply 5QI/ARP/bandwidth to the first S-NSSAI and/or the first NSI ID of the first S-NSSAI and/or the second S-NSSAI and/or the second NSI ID of the second S-NSSAI, and/or apply the charging rate to the first S-NSSAI and/or the first NSI ID of the first S-NSSAI and/or the second S-NSSAI and/or the second NSI ID of the second S-NSSAI.

Figure 20:
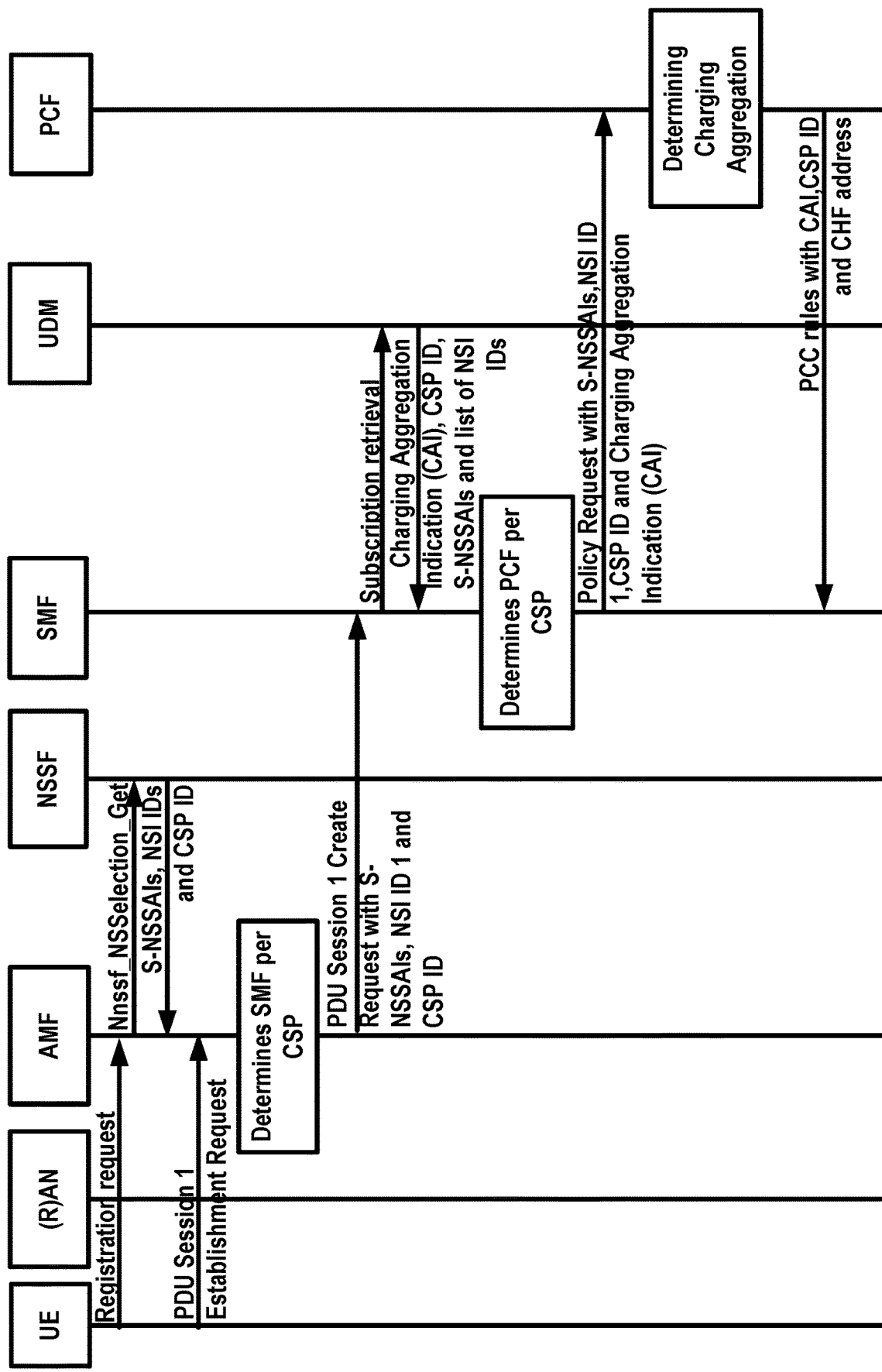
FIG. 20 is an example call flow as per an aspect of an embodiment of the present disclosure.

FIG. 20 shows example call flows which may comprise one or more actions. In an example, a UE may send a registration message to an AMF, the AMF may send a message (e.g. Nnssf_NSSelection_Get) to a NSSF requesting network slice information. The Nnssf_NSSelection_Get message may comprise at least one UE identity (e.g. SUPI, PEI, and/or GPSI). The NSSF may send a response message to the AMF comprising at least one of: an identifier of a CSP (e.g. CSP ID), and/or the list of network slices and/or network slice instances applied to the CSP. The AMF may perform actions to complete the registration procedure.

After registration, the UE may send to the AMF a first NAS message comprising at least one of: first S-NSSAI(s) and/or the first NSI ID(s) of the first S-NSSAI(s), a first DNN, a first PDU session ID, Request type, or N1 SM container (PDU session establishment request). The UE may initiate a UE requested PDU session establishment procedure by transmitting a first PDU session establishment request message within the N1 SM container of the NAS message. The first PDU session establishment request message may comprise at least one of: the first PDU session ID, Requested PDU Session Type, or a Requested SSC mode, etc.

In response to the NAS message received from the UE, the AMF may take one or more actions. In an example action, based on the information received from the AMF (e.g. first S-NSSAI(s) and/or the first NSI ID(s) of the first S-NSSAI(s)) and/or the information received from the NSSF (e.g. the CSP ID, and/or the list of network slices and/or network slice instances applied to the CSP), the AMF may map the first S-NSSAI(s) and/or the first NSI ID(s) of the first S-NSSAI(s) to the CSP, and/or map the first PDU session to the CSP. In an example, the mapping may be based on that the first S-NSSAI(s) and/or the first NSI ID(s) of the first S-NSSAI(s) is one of the lists of network slices and/or network slice instances applied to the CSP. In an example action, based on the mapping, the AMF may select an SMF per CSP and send to the selected SMF a first message (e.g. first PDUSession_CreateSMContext Request) comprising at least one of: the CSP ID, the at least one identity, the first DNN, the first S-NSSAI(s) and/or the first NSI ID(s) of the first S-NSSAI(s), the first PDU session ID, AMF ID, Request Type, Priority Access, N1 SM container (PDU Session Establishment Request), User location information, Access Type, PEI). The first message sent to the SMF may be used by the AMF to request establishing the PDU session. In response to the first PDUSession_CreateSMContext Request message received from the AMF, the SMF may take one or more actions. In an example action, the SMF may send to the AMF a response message (e.g. PDUSession_CreateSMContext Response) comprising at least one of: Cause, SM Context ID or N1 SM container (PDU Session Reject (Cause)).

In an example action, the SMF may send to a UDM and/or NSSF a message (e.g. subscription retrieval request, or Nnssf_NSSelection_Get) requesting user subscription information. The subscription retrieval request/Nnssf_NSSelection_Get message sent to the UDM and/or the NSSF may comprise at least one of: the CSP ID, the at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; the first DNN, the first S-NSSAI(s) and/or the first NSI ID(s) of the first S-NSSAI(s), the first PDU session ID, user location information, or information of the SMF for the PDU session (e.g. SMF identifier, IP address or FQDN of the SMF). In an example, the UDM and/or NSSF may send to the SMF a response message (e.g. subscription retrieval response, or Nnssf_NSSelection_Get response) comprising at least one of: the CSP ID for the first PDU session; the charging aggregation indication applied to the CSP; and/or the list of network slices and/or network slice instances applied to the CSP.

In response to the message received from the UDM and/or NSSF, the SMF may select a PCF per CSP and send to the PCF a message (e.g. first policy establishment request) comprising at least one of: the CSP ID, the at least one UE identity (e.g. SUPI, PEI, and/or GPSI), the at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); the PLMN identifier; the application identifier; the allocated application instance identifier; the first DNN, the first S-NSSAI(s) and/or the first NSI ID(s) of the first S-NSSAI(s), the first PDU session ID, user location information, or information of the SMF for the PDU session (e.g. SMF identifier, IP address or FQDN of the SMF). The first policy establishment request message may comprise at least one of: the CSP ID for the first PDU session; the charging aggregation indication applied to the CSP; and/or the list of network slices and/or network slice instances applied to the CSP.

In an example, the PCF may receive from a CSP and/or AF at least one information element: the CSP ID, the at least one first UE IP address, the first DNN, or application/service information.

In response to the message received from the SMF and the CSP and/or AF, the PCF may take one or more actions. In an example action, the PCF may map the CSP ID and/or the application/service information to a PDU session and/or network slice(s) based on the at least one first UE IP address and/or the first DNN, e.g. the at least one first UE IP address and/or the first DNN received from the CSP and/or an AF is(are) the same as the one(s) received from the SMF. In an example, the PCF may map the CSP ID and/or the application/service information to the first PDU session and/or the first S-NSSAI and/or the first NSI ID of the first S-NSSAI. In an example, the PCF may map the first PDU session and/or the first S-NSSAI and/or the first NSI ID of the first S-NSSAI to the CSP ID.

In an example action, based on the local operator policy and/or the information received from the SMF, and/or the information received from the CSP and/or an AF, the PCF may determine charging aggregation control per CSP for the UE and/or network slice(s) and/or the PDU session. In an example, the PCF may determine charging aggregation control per CSP applied to the first S-NSSAI and/or the first NSI ID of the first S-NSSAI and/or the first PDU session, and the determining may be based on at least one of: the first S-NSSAI and/or the first NSI ID of the first S-NSSAI received from the SMF; the information received from the CSP and/or an AF (e.g. CSP ID); or the mapping of the first PDU session and/or the first S-NSSAI and/or the first NSI ID of the first S-NSSAI to the CSP ID. In an example, based on the mapping of the first PDU session and/or the first S-NSSAI and/or the first NSI ID of the first S-NSSAI to the CSP ID, and based on the list of network slices and/or network slice instances applied to the CSP, the PCF may determine charging aggregation control per CSP applied to the first S-NSSAI and/or the first NSI ID of the first S-NSSAI and/or the first PDU session.

In an example action, the PCF may make policy decision for charging aggregation control, e.g. the PCF may determine PCC rules (e.g. QoS rules, traffic steering rules) and/or charging control rules for charging aggregation control per CSP for the UE and/or one or more PDU sessions and/or one or more S-NSSAIs and/or one or more network slice instances of the one or more S-NSSAIs. In an example, the PCF may determine QoS rules per CSP. In an example, the PCF may determine traffic steering rules per CSP. In an example, the PCF may determine charging control rules per CSP, wherein the PCF may determine a charging rate per CSP, and/or the PCF may determine a CHF per CSP.

In an example action, the PCF may send to the SMF a message (e.g. policy association modification request) comprising at least one of: the PCC rules and/or charging control rules for charging aggregation control per CSP; the CSP ID for the first PDU session; the charging aggregation indication applied to the CSP; or the first S-NSSAI and/or the first NSI ID of the first S-NSSAI applied to the CSP.

In response to the policy association modification request message received from the PCF, the SMF may take one or more actions. In an example action, the SMF may send to the CHF a message (e.g. a first charging data request) comprising at least one of: the CSP ID for the first PDU session; the first PDU session ID; the charging aggregation indication applied to the CSP; or the first S-NSSAI and/or the first NSI ID of the first S-NSSAI applied to the CSP.

In response to the first charging data request message, the CHF may determine a first quota per CSP for charging aggregation based on the information received from the SMF (e.g. the CSP ID; the charging aggregation indication applied to the CSP; or the first S-NSSAI and/or the first NSI ID of the first S-NSSAI applied to the CSP). In an example, the first quota per CSP may comprise at least one of: a granted unit; a time quota threshold; or a volume quota threshold. The CHF may send to the CHF a first response message (e.g. first charging data response) comprising the first quota per CSP.

In response to the first charging data response, the SMF may enforce the quota control per CSP with one or more actions. In an example action, the SMF may select a UPF per CSP based on the charging aggregation control. In an example action, the SMF may determine at least one of the following user plane rules for the first PDU session based on the first quota per CSP: at least one packet detection rule; at least one forwarding action rule; at least one QoS enforcement rule; or at least one usage reporting rule. In an example action, the SMF may send to the UPF a message comprising the at least one user plane rules.

Figure 21:
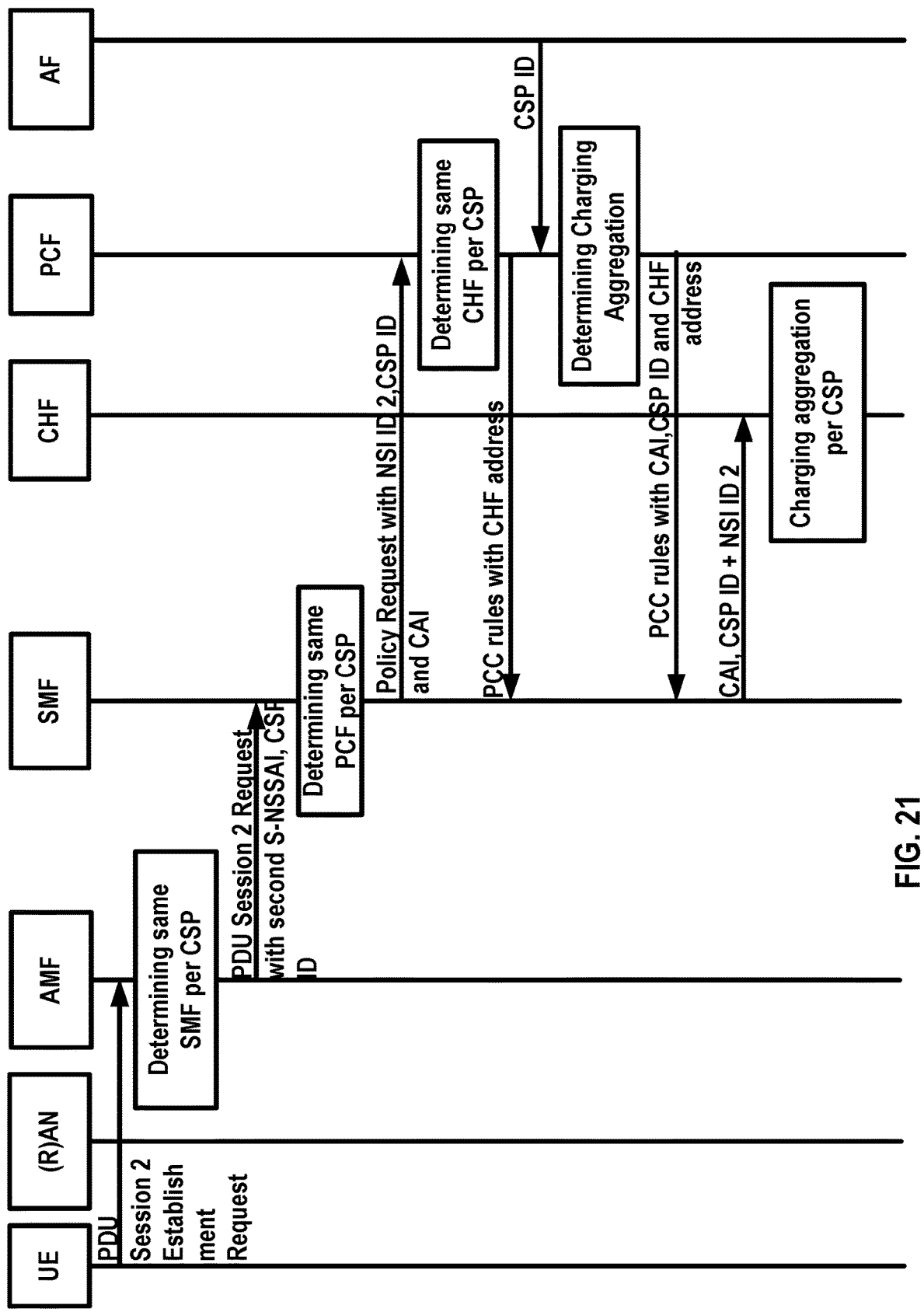
FIG. 21 is an example call flow as per an aspect of an embodiment of the present disclosure.

FIG. 21 shows example call flows which may comprise one or more actions. In an example, after UE has established at least one PDU session in FIG. 20, the UE may initiate at least one second PDU session. The procedure of the second PDU session establishment is the same as the first PDU session except one or more of the following actions. In an example, based on the information received from the NSSF (e.g. CSP ID), the AMF may select the same SMF for the second PDU session and the first PDU session. In an example, based on the information received from the NSSF (e.g. CSP ID), the AMF may select the same SMF for the first S-NSSAI and/or the first NSI ID of the first S-NSSAI and second S-NSSAI and/or second NSI ID of the second S-NSSAI. In an example, based on the information received from the UDM and/or NSSF (e.g. CSP ID), the SMF may select the same PCF for the second PDU session and the first PDU session. In an example, based on the information received from the UDM and/or NSSF (e.g. CSP ID), the SMF may select the same PCF for the first S-NSSAI and/or the first NSI ID of the first S-NSSAI and second S-NSSAI and/or second NSI ID of the second S-NSSAI. In an example action, based on the charging aggregation control per CSP determined by the PCF, the PCF may determine/select the same CHF per CSP for the first PDU session and the at least one second PDU session, and/or for the first S-NSSAI and/or the first NSI ID of the first S-NSSAI and second S-NSSAI and/or second NSI ID of the second S-NSSAI. In an example action, the PCF may make policy decision for charging aggregation control, e.g. the PCF may create/update PCC rules (e.g. QoS rules, traffic steering rules) and/or charging control rules for charging aggregation control per CSP for one or more PDU sessions (e.g. the first PDU session and the second PDU session) and/or one or more S-NSSAIs (e.g. the first S-NSSAI and the second S-NSSAI) and/or one or more network slice instances (e.g. the first NSI ID and the second NSI ID) of the one or more S-NSSAIs (e.g. the first S-NSSAI and the second S-NSSAI). In an example, the PCF may create/update QoS rules per CSP. In an example, the PCF may create/update traffic steering rules per CSP. In an example, the PCF may create/update charging control rules per CSP, wherein the PCF may create/update a charging rate per CSP, and/or the PCF may determine a CHF per CSP.

In an example action, the PCF may send to the SMF a second message (e.g. policy association modification request) comprising at least one of: the PCC rules and/or charging control rules for charging aggregation control per CSP; the CSP ID for the first PDU session and/or the second PDU session; the charging aggregation indication applied to the CSP; or the first S-NSSAI and/or the first NSI ID of the first S-NSSAI and/or the second S-NSSAI and/or the second NSI ID of the second S-NSSAI applied to the CSP. In an example, the SMF may enforce the PCC rules for the first PDU session and/or the second PDU session per CSP, e.g. apply 5QI/ARP/bandwidth to the first PDU session and/or the second PDU session, and/or apply the charging rate to the first PDU session and/or the second PDU session; e.g. apply 5QI/ARP/bandwidth to the first S-NSSAI and/or the first NSI ID of the first S-NSSAI and/or the second S-NSSAI and/or the second NSI ID of the second S-NSSAI, and/or apply the charging rate to the first S-NSSAI and/or the first NSI ID of the first S-NSSAI and/or the second S-NSSAI and/or the second NSI ID of the second S-NSSAI.

In an example, a session management function (SMF) may receive from an access and mobility management function (AMF), a first establishment request message for a first packet data unit (PDU) session of the wireless device, the first establishment request message may comprise an identifier of a communication service provider (CSP) for the first PDU session. In an example, the SMF may receive from a unified data management (UDM), a second message comprising a charging aggregation indication of the CSP for the first PDU session. In an example, the SMF may determine a charging aggregation control for the first PDU session based on the charging aggregation indication and the identifier of the CSP for the first PDU session. In an example, the SMF may select a charging function (CHF) for the first PDU session based on the charging aggregation control and the identifier of the CSP for the first PDU session. In an example, the SMF may send to the CHF, a first charging request message for the first PDU session comprising the charging aggregation indication for the CSP for the first PDU session. In an example, the SMF may receive from the AMF, a second establishment request message for a second PDU session, the second establishment request message may comprise an identifier of a CSP for the second PDU session. In an example, the SMF may select the CHF for the second PDU session based on the charging aggregation control and the identifier of the CSP for the first PDU session being same as the identifier of the CSP for the second PDU session. In an example, the SMF may send to the CHF, a second charging request message for the second PDU session comprising the charging aggregation indication of the CSP for the second PDU session. In an example, the wireless device may receive from the CSP at least one of the identifiers of the CSP; or a first requested single network slice selection assistance information (S-NSSAI). In an example, the wireless device may map the identifier of the CSP to the first PDU session. In an example, the first message may further comprise at least one of: a first single network slice selection assistance information (S-NSSAI); or a first network slice instance identifier for the first S-NSSAI. In an example, the SMF may send to the CHF, a first charging request message for the first PDU session comprising the charging aggregation indication for the CSP. In an example, the CHF may determine a first quota information for the CSP, wherein the first quota information may comprise at least one of: a granted unit; a time quota threshold; or a volume quota threshold. In an example, the CHF may send to the SMF a first response message comprising the first quota information. In an example, the wireless device may receive from the CSP a parameter requesting for the second PDU session for CSP. In an example, the wireless device may map the identifier of the CSP to the second PDU session. In an example, the second PDU session establishment request message may further comprise at least one of: a second single network slice selection assistance information (S-NSSAI); or a second network slice instance identifier for the second S-NSSAI. In an example, the SMF may send to the UDM, a first subscription request message requesting subscription information for the first PDU session of the wireless device, the first subscription request message comprising at least one of: an identity of the wireless device; a first single network slice selection assistance information (S-NSSAI); or a first network slice instance identifier for the first S-NSSAI. In an example, the SMF may send to the UDM, a second subscription request message requesting subscription information for the second PDU session of the wireless device, the second subscription request message may comprise at least one of: an identity of the wireless device; a second single network slice selection assistance information (S-NSSAI); or a second network slice instance identifier for the second S-NSSAI. In an example, the third message may further comprise at least one of: a list of S-NSSAIs; or a list of network slice instance identifiers for the list of S-NSSAIs. In an example, the list of S-NSSAIs may further comprise at least one of: a first S-NSSAI; or a second S-NSSAI. In an example, the list of network slice instance identifiers may further comprise: a first network slice instance identifier for a first S-NSSAI; a second network slice instance identifier for a second S-NSSAI. In an example, the SMF may to the CHF, a first charging request message for the first PDU session comprising the charging aggregation indication for the CSP. In an example, the SMF may receive from the CHF, a second response message comprising a second quota information, wherein the second quota information may comprise at least one of: a granted unit; a time quota threshold; or a volume quota threshold. In an example, the SMF may enforce charging aggregation control per CSP for the wireless device, wherein the enforcing may comprise: aggregation usage of the first PDU session and the second PDU session is less than the second quota information. In an example, the CHF may receive from the SMF, at least one first charging data record for the first PDU session for the CSP and at least one second charging data record for the second PDU session for the CSP. In an example, the CHF may aggregate, the at least one first charging data record and the at least one second for the CSP.

In an example, a wireless device may receive from a CSP, an identifier of a CSP (CSP ID) and a first requested S-NSSAI. In an example, the wireless device may determine to initiate a first packet data unit (PDU) session. In an example, the wireless device may map the CSP ID and the first requested S-NSSAI to the first PDU session. In an example, the wireless device may map the first requested S-NSSAI to a first S-NSSAI, wherein the first S-NSSAI is one of allowed S-NSSAIs. In an example, the wireless device may send to a session management function (SMF) a first message requesting establishment of the first PDU session, the first message may comprise the first S-NSSAI and the identifier of the CSP for determining a charging aggregation for the first PDU session. In an example, a wireless device may receive from a CSP, the CSP ID and/or a second requested S-NSSAI. In an example, the wireless device may determine to initiate a second PDU session. In an example, the wireless device may map the CSP ID and the second requested S-NSSAI to the second PDU session. In an example, the wireless device may map the second requested S-NSSAI to a second S-NSSAI, wherein the second S-NSSAI is one of allowed S-NSSAIs. In an example, the wireless device may send to the SMF a second message requesting establishment of the second PDU session, the second message may comprise the second S-NSSAI and the identifier of the CSP for determining a charging aggregation for the second PDU session.

In an example, a session management function (SMF) may receive from a wireless device via an access and mobility management function (AMF), a first message requesting establishment of a first packet data unit (PDU) session of the wireless device; In an example, the SMF may select a charging function (CHF) for the first PDU session per CSP. In an example, the SMF may receive from the wireless device, a second PDU session establishment request message comprising: a second IP address of the wireless device; a second data network name (DNN) for the PDU session; a second single network slice selection assistance information (S-NSSAI); and a second network slice instance identifier (NSI ID) for the second S-NSSAI. In an example, the SMF may receive from the application function (AF), a third message comprising: the second IP address of the wireless device; the second DNN; the identifier of a CSP (CSP ID). In an example, the SMF may map the second NSI ID to the CSP ID, based on the second IP address of the wireless device and the second DNN. In an example, the SMF may receive from a unified data management (UDM), a third message comprising: the CSP ID; and a charging aggregation indication for the CSP. In an example, the SMF may determine charging aggregation control for the CSP for the first PDU session and the second PDU session based on the CSP ID and the charging aggregation indication. In an example, the SMF may select the same CHF for the second PDU session per CSP. In an example, the SMF may send to the CHF a second charging request message for the second PDU session comprising the charging aggregation indication for the CSP. In an example, wherein the first message may comprise: a first IP address of the wireless device; a first data network name (DNN) for the PDU session; a first single network slice selection assistance information (S-NSSAI); and a first network slice instance identifier (NSI ID) for the first S-NSSAI. In an example, the SMF may receive from an application function (AF), a second message comprising at least one of: the first IP address of the wireless device; the first DNN; or an identifier of a CSP (CSP ID). In an example, the SMF may map the first NSI ID to the CSP ID, based on the first IP address of the wireless device and the first DNN.

In an example, a policy control function (PCF) may receive from a session management function (SMF), a first message requesting policy establishment for a first packet data unit (PDU) session of the wireless device. In an example, the PCF may receive from a unified data repository (UDR), a second message comprising: an identifier of a CSP (CSP ID); a charging aggregation indication for the CSP; a list of S-NSSAIs for the CSP; and a list of network slice instance identifiers for the list of S-NSSAIs. In an example, the PCF may select a charging function (CHF) for the first PDU session per CSP; In an example, the PCF may receive from the SMF, a third message requesting policy establishment for a second PDU session, the third message may comprise: a second S-NSSAI; and a second NSI ID for the second S-NSSAI. In an example, the PCF may select the same CHF for the second PDU session per CSP. In an example, the PCF may receive from the AF, a fourth message comprising the CSP ID. In an example, the PCF may map the second NSI ID to the CSP ID. In an example, the PCF may determine charging aggregation control for the CSP for the second PDU session based on: the mapping; the CSP ID; and the charging aggregation indication. In an example, the PCF may send to the SMF, a fifth message comprising: an address of the CHF; the CSP ID, and the charging aggregation indication for the CSP. In an example, the first message may comprise: a first single network slice selection assistance information (S-NSSAI); and a first network slice instance identifier (NSI ID) for the first S-NSSAI. In an example, the PCF may receive from an application function (AF), a sixth message comprising the CSP ID. In an example, the PCF may map the first NSI ID to the CSP ID. In an example, the PCF may determine charging aggregation control per CSP for the first PDU session based on: the mapping; the CSP ID; and the charging aggregation indication.

In an example, a policy control function (PCF) may receive from a session management function (SMF) a first message requesting policy establishment for a first packet data unit (PDU) session of the wireless device, the first message may comprise: a first single network slice selection assistance information (S-NSSAI); and a first network slice instance identifier (NSI ID) for the first S-NSSAI. In an example, the PCF may receive from an application function (AF), a second message comprising: an identifier of a CSP (CSP ID); a charging aggregation indication for the CSP; a list of S-NSSAIs for the CSP; and a list of network slice instance identifiers for the list of S-NSSAIs. In an example, the PCF may map the first NSI ID to the CSP ID based on the list of S-NSSAIs for the CSP. In an example, the PCF may determine charging aggregation control per CSP for the first PDU session based on: the mapping; the CSP ID; and the charging aggregation indication. In an example, the PCF may select a charging function (CHF) for the first PDU session per CSP. In an example, the PCF may receive from the SMF, a third message requesting policy establishment for a second PDU session. In an example, the PCF may select the same CHF for the second PDU session per CSP. In an example, the PCF may send to the SMF, a fourth message comprising: an address of the CHF; the CSP ID, and the charging aggregation indication for the CSP. In an example, the third message may comprise: a second S-NSSAI; and a second NSI ID for the second S-NSSAI. In an example, the PCF may from the AF, a fifth message comprising the CSP ID. In an example, the PCF may map the second NSI ID to the CSP ID. In an example, the PCF may determine charging aggregation control for the CSP for the second PDU session based on: the mapping; the CSP ID; and the charging aggregation indication.

In an example, a policy control function (PCF) may receive from a session management function (SMF), a first message requesting policy establishment for a first packet data unit (PDU) session of the wireless device, the first message may comprise an identifier of a CSP (CSP ID). In an example, the PCF may select a charging function (CHF) for the first PDU session per CSP. In an example, the PCF may receive from the SMF, a second message requesting policy establishment for a second PDU session, the second message may comprise: the CSP ID; the charging aggregation indication for the CSP; a second S-NSSAI; and a second NSI ID for the second S-NSSAI. In an example, the PCF may select the same CHF for the second PDU session per CSP. In an example, the PCF may receive from the AF, a third message comprising the CSP ID. In an example, the PCF may map the second NSI ID to the CSP ID. In an example, the PCF may determine charging aggregation control for the CSP for the second PDU session based on: the mapping; the CSP ID; and the charging aggregation indication. In an example, the PCF may send to the SMF, a fourth message comprising: an address of the CHF; the CSP ID, and the charging aggregation indication for the CSP. In an example, the first message may comprise: an identifier of a CSP (CSP ID); a charging aggregation indication for the CSP; a first single network slice selection assistance information (S-NSSAI); and a first network slice instance identifier (NSI ID) for the first S-NSSAI. In an example, the PCF may receive from an application function (AF), a fifth message comprising the CSP ID. In an example, the PCF may map the first NSI ID to the CSP ID. In an example, the PCF may determine charging aggregation control per CSP for the first PDU session based on: the mapping; the CSP ID; and the charging aggregation indication.

According to various embodiments, a device such as, for example, a wireless device, off-network wireless device, a base station, a session management function, a policy control function, an application function, a mobility management function, a unified data management, a charging function and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 22:
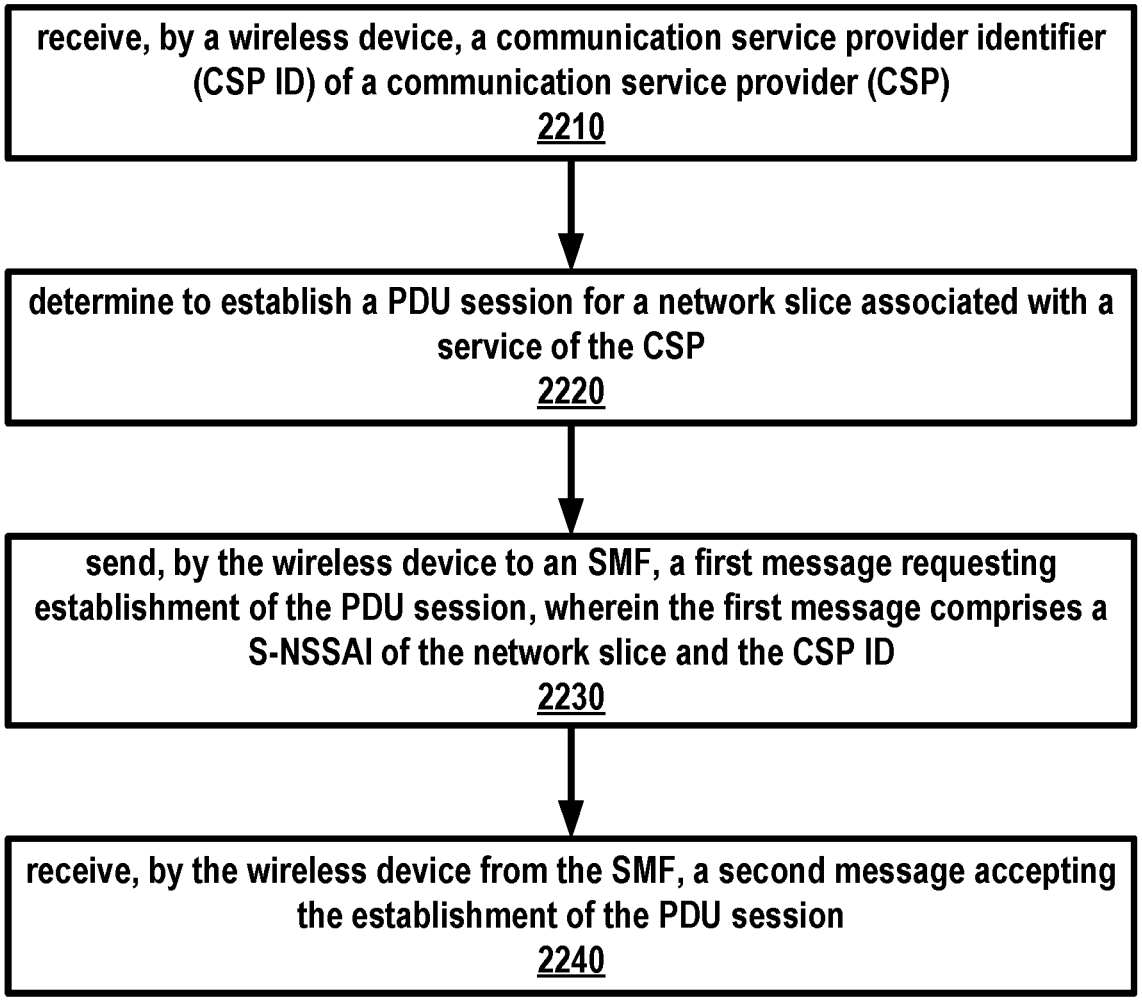
FIG. 22 is a flow diagram as per an aspect of an example embodiment of the present disclosure.

FIG. 22 is a flow diagram as per an aspect of an example embodiment of the present disclosure. At 2210, a wireless device may receive a communication service provider identifier (CSP ID) of a communication service provider (CSP). At 2220, the wireless device may determine to establish a packet data unit (PDU) session for a network slice associated with a service of the CSP. At 2230, the wireless device may send to a session management function (SMF) a first message requesting establishment of the PDU session. The first message may comprise a single network slice selection assistance information (S-NSSAI) of the network slice and the CSP ID. At 2240, the wireless device may receive from the SMF a second message accepting the establishment of the PDU session.

According to various embodiments, a wireless device may receive a requested S-NSSAI for the network slice from the CSP. According to various embodiments, the wireless device may map the CSP ID and the requested S-NSSAI to the PDU session. According to various embodiments, based on the CSP ID and the requested S-NSSAI, the SMF may determine a charging aggregation control for the PDU session. According to various embodiments, the wireless device may receive the CSP ID and a second requested S-NSSAI from the CSP. According to various embodiments, the wireless device may map the CSP ID and the second requested S-NSSAI to a second PDU session. According to various embodiments, the wireless device may send to the SMF a second message requesting establishment of the second PDU session. The second message may comprise the second requested S-NSSAI and the CSP ID for determining a charging aggregation for the second PDU session. According to various embodiments, based on the CSP ID and the second requested S-NSSAI, the SMF may determine a charging aggregation control for the second PDU session.

According to various embodiments, a policy control function (PCF) may receive from the SMF a first policy request message for the PDU session. The first policy request message may comprise a first UE internet protocol (IP) address. The first policy request message may comprise a first data network name (DNN). The first policy request message may comprise a PDU session ID for the PDU session. According to various embodiments, the PCF may receive a service information message from an application function (AF). The service information message may comprise the CSP ID. The service information message may comprise the first UE IP address. The service information message may comprise the first DNN. According to various embodiments, based on the policy request message and the service information message, the PCF may map the CSP ID to the PDU session.

According to various embodiments, a system may comprise a wireless device. The wireless device may comprise one or more first processors. The first memory may store first instructions. The one or more first processors may execute the first instructions. Executing the first instruction may cause the wireless device to receive a communication service provider identifier (CSP ID) of a communication service provider. Executing the first instruction may cause the wireless device to determine to establish a packet data unit (PDU) session for a network slice associated with a service of the CSP. Executing the first instruction may cause the wireless device to send a first message requesting establishment of the PDU session, wherein the first message comprises a single network slice selection assistance information (S-NSSAI) of the network slice and the CSP ID. Executing the first instruction may cause the wireless device to receive a second message accepting the establishment of the PDU session. Executing the first instruction may cause the wireless device to receive a requested S-NSSAI for the network slice from the CSP.

According to various embodiments, a system may comprise a session management function (SMF). The SMF may comprise one or more second processors. The SMF may comprise second memory storing second instructions. The one or more second processors may execute the second instructions. Executing the second instruction may cause the SMF to receive from the wireless device the first message requesting establishment of the PDU session. Executing the second instruction may cause the SMF to send to the wireless device the second message accepting the establishment of the PDU session.

Figure 23:
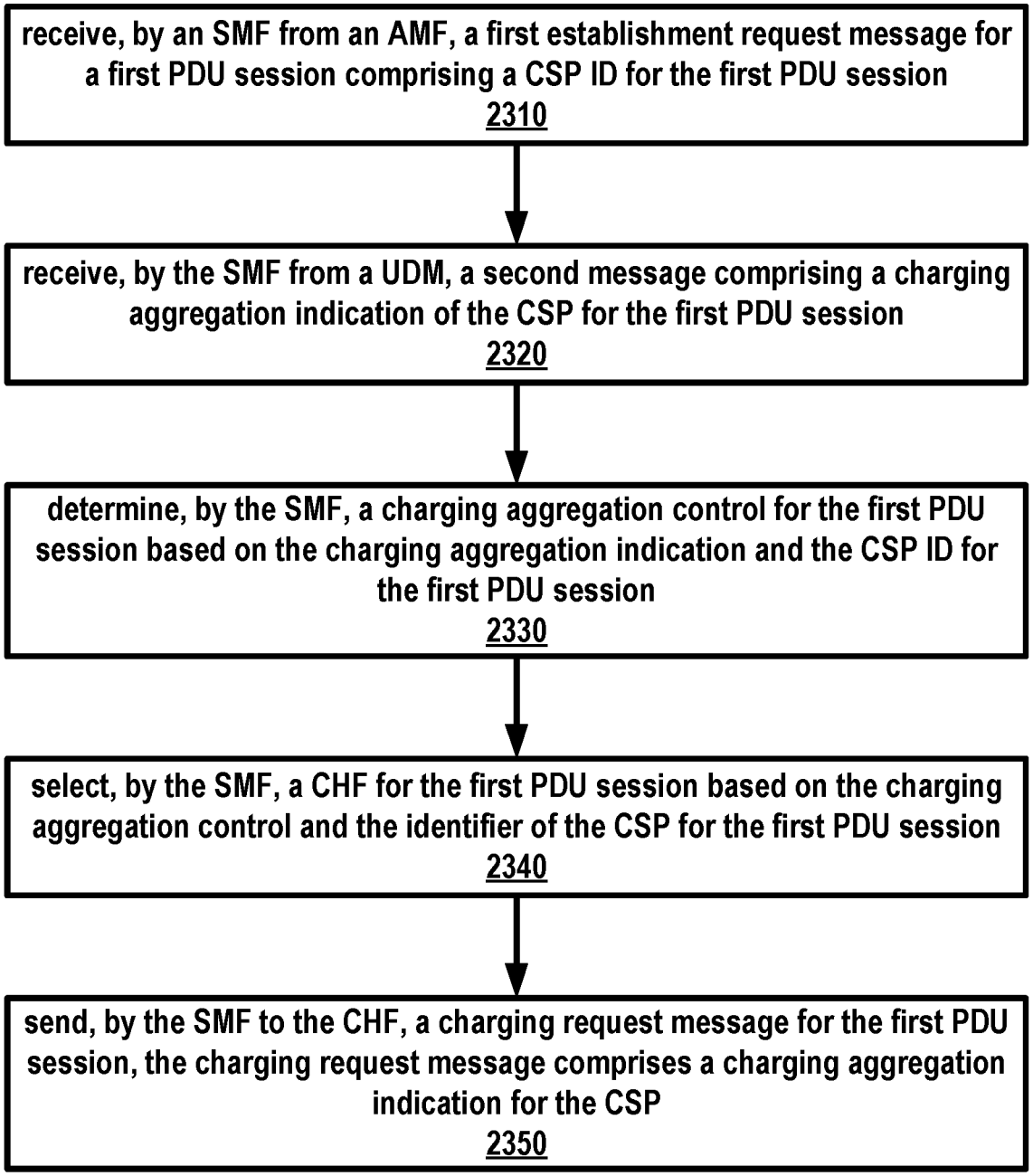
FIG. 23 is a flow diagram as per an aspect of an example embodiment of the present disclosure.

FIG. 23 is a flow diagram as per an aspect of an example embodiment of the present disclosure. At 2310, an SMF may receive from an AMF a first establishment request message for a first PDU session. The first establishment request message may comprise a CSP ID for the first PDU session. At 2320, the SMF may receive from a UDM a second message. The second message may comprise a charging aggregation indication of the CSP for the first PDU session. At 2330, based on the charging aggregation indication and the CSP ID for the first PDU session, the SMF may determine a charging aggregation control for the first PDU session. At 2340, based on the charging aggregation control and the identifier of the CSP for the first PDU session, the SMF may select a CHF for the first PDU session. At 2350, the SMF may send to the CHF a charging request message for the first PDU session. The charging request message may comprise a charging aggregation indication for the CSP.

FIG. 24 is a flow diagram as per an aspect of an example embodiment of the present disclosure. At 2410, a PCF may receive from an SMF a first message requesting policy establishment for a PDU session of the wireless device. The first message may comprise a first S-NSSAI. At 2420, the PCF may receive from an AF a second message. The second message may comprise a CSP ID. The second message may comprise a charging aggregation indication for the CSP. The second message may comprise a list of S-NSSAIs for the CSP. At 2430, based on first S-NSSAI and the list of S-NSSAIs for the CSP, the PCF may map the CSP ID to the PDU session. At 2440, based on the map, the CSP ID, and/or the charging aggregation indication, the PCF may determine charging aggregation control per CSP for the PDU session. At 2450, the PCF may send to the SMF a third message for the PDU session. The third message may comprise an address of the CHF for the CSP. The third message may comprise the CSP ID. The third message may comprise the charging aggregation indication for the CSP.

According to various embodiments, a session management function (SMF) may receive from an access and mobility management function (AMF) a first establishment request message for a first packet data unit (PDU) session of the wireless device. The first establishment request message may comprise the CSP ID for the first PDU session. According to various embodiments, the SMF may receive a subscription response message from a unified data management (UDM). The subscription response message may comprise a charging aggregation indication of the CSP for the first PDU session. According to various embodiments, based on the charging aggregation indication and the CSP ID for the first PDU session, the SMF may determine a charging aggregation control for the first PDU session. According to various embodiments, based on the charging aggregation control and the identifier of the CSP for the first PDU session, the SMF may select a charging function (CHF) for the first PDU session. According to various embodiments, the SMF may send to the CHF a first charging request message for the first PDU session. The first charging request message may comprise the charging aggregation indication for the CSP. According to various embodiments, the CHF may determine a first quota information for the CSP. The first quota information may comprise a first granted unit. The first quota information may comprise a first time quota threshold. The first quota information may comprise a first volume quota threshold. According to various embodiments, the SMF may receive a first charging response message from the CHF. The first charging response message may comprise the first quota information. According to various embodiments, the SMF may receive from the AMF a second establishment request message for a second PDU session. The second establishment request message may comprise the CSP ID for the second PDU session. According to various embodiments, based on the charging aggregation control and the CSP ID for the first PDU session being same as the CSP ID for the second PDU session, the SMF may select the CHF for the second PDU session. According to various embodiments, the SMF may send to the CHF a second charging request message for the second PDU session. The second charging request message may comprise the charging aggregation indication of the CSP for the second PDU session. According to various embodiments, the SMF may receive from the CHF a second response message. The second response message may comprise a second quota information. The second quota information may comprise a second granted unit. The second quota information may comprise a second time quota threshold. The second quota information may comprise a second volume quota threshold. According to various embodiments, the SMF may enforce charging aggregation control per CSP for the wireless device. The enforcing may comprise aggregation usage of the first PDU session and the second PDU session is less than the second quota information. According to various embodiments, the CHF may receive from the SMF at least one first charging data record for the first PDU session for the CSP and at least one second charging data record for the second PDU session for the CSP. According to various embodiments, the CHF may aggregate the at least one first charging data record and the at least one second for the CSP.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a session management function (SMF) from a wireless device, a first message requesting establishment of a packet data unit (PDU) session for a network slice associated with a service of a communication service provider (CSP), wherein the first message comprises:
   a single network slice selection assistance information (S-NSSAI) of the network slice; and
   a CSP identifier (ID); and
   sending, from the SMF to the wireless device, a second message accepting the establishment of the PDU session for the network slice associated with the service of the CSP.

2. The method of claim 1, wherein the CSP ID and a requested S-NSSAI received by the wireless device are mapped to the PDU session.

3. The method of claim 2, further comprising determining, by the SMF and based on the CSP ID and the requested S-NSSAI, a charging aggregation control for the PDU session.

4. The method of claim 1, wherein the CSP ID and a second requested S-NSSAI received by the wireless device are mapped to a second PDU session.

5. The method of claim 4, further comprising receiving, by the SMF from the wireless device, a third message requesting establishment of the second PDU session, wherein the third message comprises the second requested S-NSSAI and the CSP ID.

6. The method of claim 5, further comprising determining, by the SMF and based on the CSP ID and the second requested S-NSSAI, a second charging aggregation control for the second PDU session.

7. The method of claim 5, wherein the third message comprises a network slice instance identifier (NSI ID).

8. The method of claim 7, further comprising mapping, by the SMF, the NSI ID to the CSP ID.

9. The method of claim 1, further comprising sending, by the SMF to a policy control function (PCF), a first policy request message for the PDU session, the first policy request message comprising at least one of:
- a first UE internet protocol (IP) address;
- a first data network name (DNN); or
- a PDU session ID for the PDU session.

10. The method of claim 1, further comprising selecting, by the SMF and based on the CSP ID, a charging function for the first PDU session.

11. A session management function (SMF) comprising: one or more processors and memory storing instructions that, when executed by the one or more processors, cause the SMF to perform operations comprising:
- receiving, from a wireless device, a first message requesting establishment of a packet data unit (PDU) session for a network slice associated with a service of a communication service provider (CSP), wherein the first message comprises:
  - a single network slice selection assistance information (S-NSSAI) of the network slice; and
  - a CSP identifier (ID); and
- sending, to the wireless device, a second message accepting the establishment of the PDU session for the network slice associated with the service of the CSP.

12. The SMF of claim 11, wherein the CSP ID and a requested S-NSSAI received by the wireless device are mapped to the PDU session.

13. The SMF of claim 12, wherein the operations further comprise determining, based on the CSP ID and the requested S-NSSAI, a charging aggregation control for the PDU session.

14. The SMF of claim 11, wherein the CSP ID and a second requested S-NSSAI received by the wireless device are mapped to a second PDU session.

15. The SMF of claim 14, wherein the operations further comprise receiving, from the wireless device, a third message requesting establishment of the second PDU session, wherein the third message comprises the second requested S-NSSAI and the CSP ID.

16. The SMF of claim 15, wherein the operations further comprise determining, based on the CSP ID and the second requested S-NSSAI, a second charging aggregation control for the second PDU session.

17. The SMF of claim 15, wherein the third message comprises a network slice instance identifier (NSI ID).

18. The SMF of claim 17, wherein the operations further comprise mapping the NSI ID to the CSP ID.

19. The SMF of claim 11, wherein the operations further comprise sending, to a policy control function (PCF), a first policy request message for the PDU session, the first policy request message comprising at least one of:
- a first UE internet protocol (IP) address;
- a first data network name (DNN); or
- a PDU session ID for the PDU session.

20. A system comprising:
- a session management function (SMF) comprising one or more first processors amd and memory storing first instructions that, when executed by the one or more first processors, cause the SMF to perform operations comprising:
  - receiving, from a wireless device, a first message requesting establishment of a packet data unit (PDU) session for a network slice associated with a service of a communication service provider (CSP), wherein the first message comprises:
    - a single network slice selection assistance information (S-NSSAI) of the network slice; and
    - a CSP identifier (ID); and
  - sending, to the wireless device, a second message accepting the establishment of the PDU session for the network slice associated with the service of the CSP; and
- the wireless device, wherein the wireless device comprises one or more second processors and memory storing second instructions that, when executed by the one or more second processors, cause the wireless device to perform operations comprising:
  - sending, to the SMF, the first message requesting establishment of the PDU session; and
  - receiving, from the SMF, the second message accepting the establishment of the PDU session.

* * * * *